(12) United States Patent
Oike et al.

(10) Patent No.: US 10,681,319 B2
(45) Date of Patent: Jun. 9, 2020

(54) IMAGE PROJECTION SYSTEM, PROJECTOR, AND METHOD FOR CONTROLLING IMAGE PROJECTION SYSTEM

(71) Applicant: SEIKO EPSON CORPORATION, Tokyo (JP)

(72) Inventors: Takumi Oike, Matsumoto (JP); Takashi Toyooka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/408,116

(22) Filed: Jan. 17, 2017

(65) Prior Publication Data
US 2017/0208309 A1    Jul. 20, 2017

(30) Foreign Application Priority Data

Jan. 20, 2016 (JP) ................................. 2016-008526

(51) Int. Cl.
*H04N 9/31* (2006.01)
*G03B 37/04* (2006.01)

(52) U.S. Cl.
CPC .......... *H04N 9/3194* (2013.01); *H04N 9/315* (2013.01); *H04N 9/3147* (2013.01); *H04N 9/3179* (2013.01); *H04N 9/3182* (2013.01); *G03B 37/04* (2013.01)

(58) Field of Classification Search
None
See application file for complete search history.

(56) References Cited

U.S. PATENT DOCUMENTS

| 9,560,327 | B2* | 1/2017 | Ehara | H04N 9/3185 |
| 9,686,516 | B2* | 6/2017 | Tocze | H04N 9/31 |
| 9,817,305 | B2* | 11/2017 | Kim | G03B 21/53 |
| 2002/0024640 | A1 | 2/2002 | Ioka | |
| 2008/0259223 | A1* | 10/2008 | Read | H04N 9/3147 348/745 |
| 2011/0181565 | A1* | 7/2011 | Asamura | H04N 9/3194 345/207 |

(Continued)

FOREIGN PATENT DOCUMENTS

| JP | 2002-072359 A | 3/2002 |
| JP | 2007-300539 A | 11/2007 |
| JP | 2007300539 A * | 11/2007 |

*Primary Examiner* — Jefferey F Harold
*Assistant Examiner* — Humam M Satti
(74) *Attorney, Agent, or Firm* — Oliff PLC

(57) ABSTRACT

Projectors include a first projector that projects a first image and a second projector that projects a second image. The first projector includes a first control section that corrects the first image based on a first captured image produced by capturing an image of the range containing at least part of the first image and part of the second image and with reference to a target area contained in the range over which the first captured image is captured, and the second projector includes a second control section that corrects the second image based on a second captured image produced by capturing an image of the range containing part of the first image and at least part of the second image and with reference to the target area contained in the range over which the second captured image is captured.

20 Claims, 9 Drawing Sheets

(56) References Cited

U.S. PATENT DOCUMENTS

| | | | | |
|---|---|---|---|---|
| 2011/0191690 A1* | 8/2011 | Zhang | ............... | G06F 3/00 |
| | | | | 715/746 |
| 2015/0138222 A1* | 5/2015 | Imaizumi | ............ | H04N 9/3182 |
| | | | | 345/589 |
| 2015/0296192 A1* | 10/2015 | Maeda | ............... | H04N 9/3185 |
| | | | | 348/745 |
| 2016/0088233 A1* | 3/2016 | Lu | ............... | H04N 5/265 |
| | | | | 348/239 |
| 2016/0291919 A1* | 10/2016 | Kurota | ............... | H04N 9/3147 |
| 2017/0070711 A1* | 3/2017 | Grundhofer | ......... | H04N 9/3147 |
| 2017/0127027 A1* | 5/2017 | Naganuma | ............... | G09G 5/10 |

\* cited by examiner

IMAGE PROJECTION SYSTEM, PROJECTOR, AND METHOD FOR CONTROLLING IMAGE PROJECTION SYSTEM

CROSS-REFERENCE

The entire disclosure of Japanese Patent Application No. 2016-008526, filed Jan. 20, 2016 is expressly incorporated by reference herein.

BACKGROUND

1. Technical Field

The present invention relates to an image projection system, a projector, and a method for controlling the image projection system.

2. Related Art

There is a known technology of related art for concatenating images projected by a plurality of projectors with each other to display a single large image. In a case where a plurality of projectors project images, individual differences among the projector and other factors thereof result in differences in color and brightness of the images projected by the projectors in some cases. When the differences are noticeable, display quality lowers accordingly. To avoid the problem, a method for correcting images projected by a plurality of projectors to eliminate differences among the images has been proposed (see JP-A-2002-72359, for example). The image projection/display apparatus described in JP-A-2002-72359 sequentially projects images from a plurality of projectors on a screen, sequentially captures the projected images through a colorimetry system, and corrects color differences among the projectors.

The configuration described in JP-A-2002-72359 requires a camera capable of capturing the entire images projected by the plurality of projectors. On the other hand, to attempt correction of the projected images by using a camera having simpler configuration, it is conceivable to use images captured with a plurality of cameras or perform image capturing multiple times with a single camera. In this case, the approach of the related art cannot be applied because differences, for example, in the conditions under which the plurality of images are captured or the sensitivities of the cameras affect the correction.

SUMMARY

An advantage of some aspects of the invention is that differences among images projected by a plurality of projectors can be corrected without use of a camera capable of capturing the entire images projected by the projectors.

An aspect of the invention is directed to an image projection system in which a plurality of projectors project images, wherein each of the projectors includes a projection section that projects an image, an imaging section that captures an image of a range containing at least part of the image projected by the projection section and part of the images projected by the other projectors, and a correction processing section that corrects, in accordance with a target area, a correction target area set in an area other than the target area in the projected image, the target area set, based on the image captured by the imaging section, in the image projected by the projection section.

According to the configuration described above, each of the projectors can correct a projected image, so that the process of specifying a reference value on the basis of the entire images projected by the plurality of projectors or any other process is not required. Further, the correction performed by using a captured image containing an image projected by the projection section and part of images projected by the other projectors allows the quality of the image projected by the projection section to be so corrected as to match with those of the images projected by the other projectors. The qualities of the images projected by the plurality of projectors are therefore allowed to match with one another with no need to capture the entire images projected by the plurality of projectors but by causing the projectors to appropriately correct the projected images.

In the image projection system described above, the correction processing section may compare an imaged value in the target area in the captured image with an imaged value in the correction target area in the captured image to determine a correction value used to correct the correction target area.

According to the configuration described above, the comparison between the imaged values in the captured image readily allows the qualities of the images projected by the plurality of projectors to be so corrected as to match with one another.

In the image projection system described above, the correction target area corrected by the correction processing section may be set to be the target area, and the correction processing section may correct the correction target area in accordance with the set target area.

According to the configuration described above, the qualities of the entire images projected by the plurality of projectors are allowed to match with one another with no need to capture the entire images projected by the plurality of projectors but by setting the corrected correction target area to be the target area and then performing the correction.

In the image projection system described above, the plurality of projectors may be so arranged that images projected by the plurality of projectors are combined with one another to form an integrated image on a projection surface. One of the projectors is a control projector, and the control projector includes the correction control section that sets an area regarded as the target area in the integrated image on the basis of images captured by the imaging sections of the other projectors.

According to the configuration described above, in the image projection system that projects an integrated image on the basis of images projected by the plurality of projectors, the qualities of the projected images can be so corrected as to match with one another with no need to use a camera or any other device that captures the entire integrated image all at once. Unevenness in color and brightness of the integrated image can thus be reduced.

In the image projection system described above, the correction processing section of at least one of the projectors corrects the brightness of the area other than the target area in the projected image in accordance with the target area set by the correction control section of the control projector.

According to the configuration described above, the target area in the integrated image can therefore be appropriately set on the basis of images captured by the plurality of projectors.

Another aspect of the invention is directed to projectors that form the image projection system in which a plurality of projectors project images, wherein each of the projectors includes a projection section that projects an image, an imaging section that captures an image of a range containing at least part of the image projected by the projection section and part of the images projected by the other projectors, and a correction processing section that corrects, in accordance with a target area, an area other than the target area in the projected image, the target area set, based on the image captured by the imaging section, in the image projected by the projection section.

When the thus configured projectors are used to form an image projection system, each of the projectors can correct a projected image, so that the process of specifying a reference value on the basis of the entire images projected by the plurality of projectors or any other process is not required. Further, the correction performed by using a captured image containing an image projected by the projection section and part of images projected by the other projectors allows the quality of the image projected by the projection section to be so corrected as to match with those of the images projected by the other projectors. The qualities of the images projected by the plurality of projectors are therefore allowed to match with one another with no need to capture the entire images projected by the plurality of projectors but by causing the projectors to appropriately correct the projected images.

Another aspect of the invention is directed to an image projection system including a first projector that projects a first image and a second projector that projects a second image, wherein the first projector includes a first control section that corrects the first image based on a first captured image produced by capturing an image of a range containing at least part of the first image and part of the second image and with reference to a target area contained in a range over which the first captured image is captured, and the second projector includes a second control section that corrects the second image based on a second captured image produced by capturing an image of a range containing part of the first image and at least part of the second image and with reference to the target area contained in a range over which the second captured image is captured.

According to the configuration described above, each of the first projector and the second projector can correct the image projected by the projector on the basis of the captured image produced by capturing the range containing the projected image. The image projected by the first projector and the image projected by the second projector can therefore be appropriately corrected with no need to capture the entire images projected by the first projector and the second projector. Further, since the first projector and the second projector perform the correction with reference to the target area, the qualities of the image projected by the first projector and the image projected by the second projector can be so corrected as to match with each other.

In the image projection system described above, the first control section may compare an imaged value in the target area in the first captured image with an imaged value in a correction target area set in an area other than the target area in the first image to determine a correction value used to correct the correction target area.

According to the configuration described above, the comparison between the imaged values in the captured image readily allows the qualities of the images projected by the plurality of projectors to be so corrected as to match with one another.

In the image projection system described above, the second control section may compare an imaged value in the target area in the second captured image with an imaged value in a correction target area set in an area other than the target area in the second image to determine a correction value used to correct the correction target area. According to the configuration described above, the comparison between the imaged values in the captured image readily allows the qualities of the images projected by the plurality of projectors to be so corrected as to match with one another.

In the image projection system described above, the first projector may include a first communication section that transmits information to the second projector, and the first control section may compare the first captured image with the second captured image to set the target area and cause the first communication section to transmit information representing the target area to the second projector.

According to the configuration described above, the first projector can compare a plurality of captured images with one another to set the target area, and each of the first and second projectors can correct the projected images with reference to the target area. The plurality of captured images can thus be used to efficiently allow the qualities of the image projected by the first projector and the image projected by the second projector to match with each other.

In the image projection system described above, the first control section may set the correction target area corrected by the first control section or the correction target area corrected by the second control section to be the target area.

According to the configuration described above, the qualities of the entire images projected by the plurality of projectors are allowed to match with one another with no need to capture the entire images projected by the plurality of projectors but by setting the corrected correction target area to be the target area and then performing the correction.

In the image projection system described above, the second projector may include a projection section including a light source and a modulator that modulates light emitted from the light source based on second image data to generate image light that forms the second image, and the second control section may correct the second image data in such a way that brightness of the image light generated by the modulator is corrected with reference to the target area contained in the range over which the second captured image is captured.

According to the configuration described above, the brightness of the projected image can be appropriately corrected.

In the image projection system described above, the second control section may correct the second image data in such a way that color of the image light generated by the modulator is corrected with reference to the target area contained in the range over which the second captured image is captured.

According to the configuration described above, the color of the projected image can be appropriately corrected.

The image projection system described above may further include a third projector that projects a third image. The third projector may include a third control section that corrects the third image based on a third captured image produced by capturing an image of a range containing at least part of the third image and at least one of part of the first image and part of the second image and with reference to a target area contained in a range over which the third captured image is captured. The first projector may include a first communication section that transmits information to the second projector and the third projector. The first control section of the first projector may compare the first captured image, the second captured image, and the third captured image with one another to set the target area. In a case where the set target area is contained in the second captured image, the first control section may transmit information representing the target area via the first communication section to the second projector. In a case where the set target area is contained in the third captured image, the first control section may transmit information representing the target area via the first communication section to the third projector. In a case where the set target area is contained in the first captured image, the first control section may correct the first image with reference to the target area.

According to the configuration described above, the three projectors can correct the respective projected images on the basis of the captured images produced by capturing the ranges containing the projected images. The qualities of the images projected by the three projectors are therefore allowed to match with one another with no need to capture the entire images projected by the projectors but by appropriate correction of the projected images.

Another aspect of the invention is directed to a projector that projects a first image, the projector including a control section that corrects the first image based on a first captured image produced by capturing a range containing part of a second image projected by a second projector that is separate from the first projector and at least part of the first image and with reference to a target area contained in a range over which the first captured image is captured.

According to the configuration described above, the image projected by one of the projectors can be corrected in accordance with the image projected by the other projector.

The projector described above may further include an imaging section that captures the first captured image.

According to the configuration described above, imaging is performed and the projected image is corrected on the basis of a captured image, whereby the projected image can be corrected in accordance with the image projected by the other projector.

Another aspect of the invention is directed to a method for controlling an image projection system in which a plurality of projectors project images, the method including causing one of the projectors to capture an image of a range containing at least part of the projected image and part of the images projected by the other projectors and correct a correction target area in accordance with a target area, the target area set in the projected image based on the captured image, the correction target area set in an area other than the target area in the projected image.

According to the configuration described above, the image projected one of the projectors can be corrected in accordance with the images projected by the other projectors.

Another aspect of the invention is directed to a method for controlling an image projection system including a first projector that projects a first image and a second projector that projects a second image, the method including: causing the first projector to correct the first image based on a first captured image produced by capturing an image of a range containing at least part of the first image and part of the second image and with reference to a target area contained in a range over which the first captured image is captured, and causing the second projector to correct the second image based on a second captured image produced by capturing an image of a range containing part of the first image and at least part of the second image and with reference to the target area contained in a range over which the second captured image is captured.

According to the configuration described above, each of the first projector and the second projector can correct the image projected by the projector on the basis of the captured image produced by capturing the range containing the projected image. The image projected by the first projector and the image projected by the second projector can therefore be appropriately corrected with no need to capture the entire images projected by the first projector and the second projector. Further, since the first projector and the second projector perform the correction with reference to the target area, the correction is so performed that the image projected by the first projector and the image projected by the second projector are made uniform, whereby a high-quality image can be projected.

The invention can also be implemented in a variety of forms other than the image projection system, the projector, and the method for controlling the image projection system described above. For example, the invention can also be implemented in the form of a program executed by the control section that controls the projector described above or a program that allows a computer to carry out the control method described above. Further, for example, the invention can be implemented in the form of a recording medium on which the program described above is recorded, a server device that distributes the program, a transmission medium that transmits the program described above, or a data signal carrying the program described above embodied in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
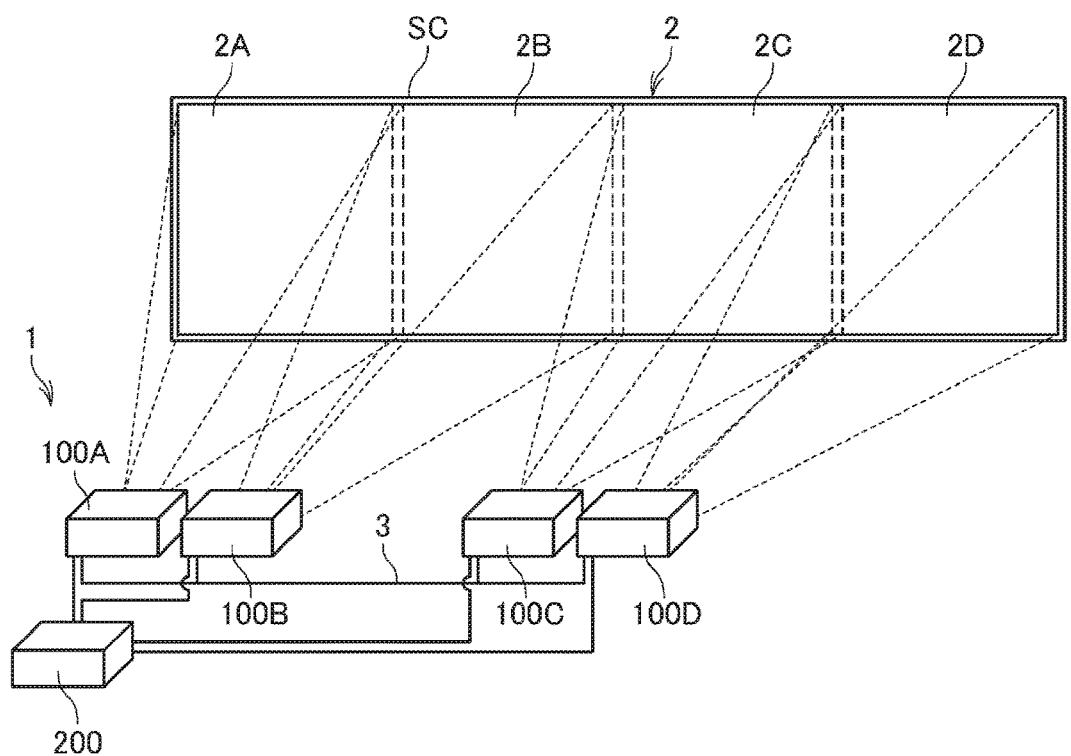
FIG. 1 is a system configuration diagram of an image projection system according to a first embodiment.

An embodiment of the invention will be described below with reference to the drawings. FIG. 1 is a configuration diagram of an image projection system 1 according to a first embodiment.

The image projection system 1 shown in FIG. 1 includes a plurality of projectors. The image projection system 1 according to the present embodiment includes four projectors 100A, 100B, 100C, and 100D, and FIG. 1 shows a case where the projectors 100A, 100B, 100C, and 100D are arranged in the lateral direction (horizontal direction). The projectors 100A, 100B, 100C, and 100D are disposed in front of a screen SC, which serves as a projection surface, and project images on the screen SC.

FIG. 1 shows a configuration in which the projector 100A, which corresponds to a first projector, is located at the left end, by way of example, but the projectors 100A, 100B, 100C, and 100D are arbitrarily arranged. For example, the projector 100A may be disposed in a position shifted to the center of the entire projectors 100A, 100B, 100C, and 100D. Further, the number of projectors is not four, such as the projectors 100A, 100B, 100C, and 100D, and may instead be greater or smaller than four. In the following description, in a case where it is not necessary to distinguish the projectors 100A, 100B, 100C, and 100D from one another, the projectors 100A, 100B, 100C, and 100D are collectively called projectors 100.

The image projection system 1 is a multi-projection system in which the projectors 100A, 100B, 100C, and 100D project a plurality of projection images on the large screen SC. The projector 100A projects a first image 2A. The projector 100B projects a second image 2B. The projector 100C projects a third image 2C. The projector 100D projects a fourth image 2D. The first image 2A, the second image 2B, the third image 2C, and the fourth image 2D are concatenated with each other to form a single large projected image 2.

Each of the projectors 100A, 100B, 100C, and 100D is connected to an image supply apparatus 200, which supplies image data. The image supply apparatus 200 is wired to each of the projectors 100A, 100B, 100C, and 100D. On the basis of image data that forms the projected image 2 (integrated image), the image supply apparatus 200 produces image data sets corresponding to portions projected by the projectors 100A, 100B, 100C, and 100D and supplies the projectors 100A, 100B, 100C, and 100D with the respective image data sets.

Each of the projectors 100A, 100B, 100C, and 100D projects an image on the screen SC on the basis of the corresponding image data set supplied from the image supply apparatus 200.

The projector 100A functions, for example, as a first projector, and the projectors 100B, 100C, and 100D each function as a second projector. Further, the projectors 100B, 100C, and 100D can each function as a third projector. The projectors 100B, 100C, and 100D can each instead function as a third projector. The first image 2A projected by the projector 100A corresponds to a first image, and the second image 2B, the third image 2C, and the fourth image 2D projected by the projectors 100B, 100C, and 100D each correspond to a second image.

A control section 160A of the projector 100A, which will be described later, corresponds to a first control section, and control sections 160B, 160C, and 160D of the projectors 100B, 100C, and 100D each correspond to a second control section or a third control section.

Further, an image captured by an imaging section 140A of the projector 100A, which will be described later, corresponds to a first captured image, and images captured by imaging sections 140B, 140C, and 140D of the projectors 100B, 100C, and 100D each corresponds to a second captured image or a third captured image.

Figure 2:
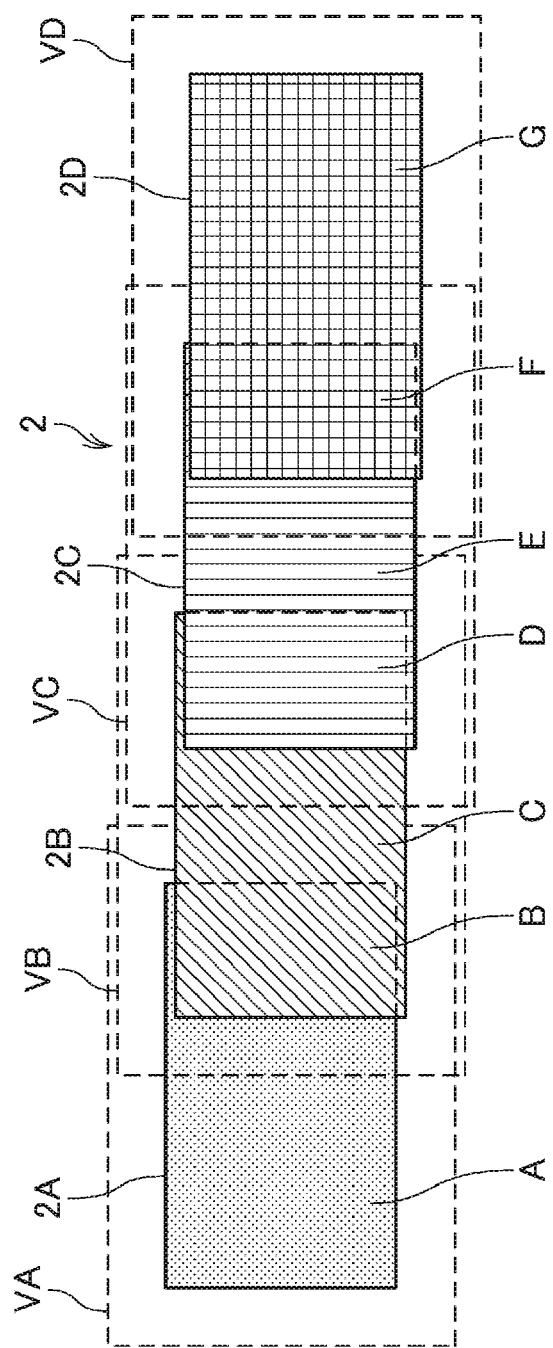
FIG. 2 a descriptive diagram showing images projected by the image projection system according to the first embodiment.

FIG. 2 shows images projected on the screen SC by the image projection system 1.

To combine images projected by the plurality of projectors 100A, 100B, 100C, and 100D with one another and project the resultant single large projection image, the images are so projected that projection areas where images are projected by projectors 100 adjacent to each other partly overlap with each other. The overlapping portion is called an overlapping area. Specifically, the first image 2A projected by the projector 100A partly overlaps with the second image 2B projected by the projector 100B. Similarly, the second image 2B projected by the projector 100B partly overlaps with the third image 2C projected by the projector 100C. The third image 2C projected by the projector 100C partly overlaps with the fourth image 2D projected by the projector 100D.

The entire projected image 2 can be divided into overlapping areas and non-overlapping areas and classified into seven areas labeled with reference characters A to G in FIG. 2. Areas B, D, and F are overlapping areas. In FIG. 2, the first image 2A, the second image 2B, the third image 2C, and the fourth image 2D are shifted from each other in the upward/downward direction only for ease of understanding. In practice, the positions of the first image 2A, the second image 2B, the third image 2C, and the fourth image 2D in the upward/downward direction are appropriately so aligned with one another that the four images form a single large rectangular projection image.

The projectors 100A, 100B, 100C, and 100D are so connected to one another via a communication line 3 that data communication is established among the four projectors.

Figure 3:
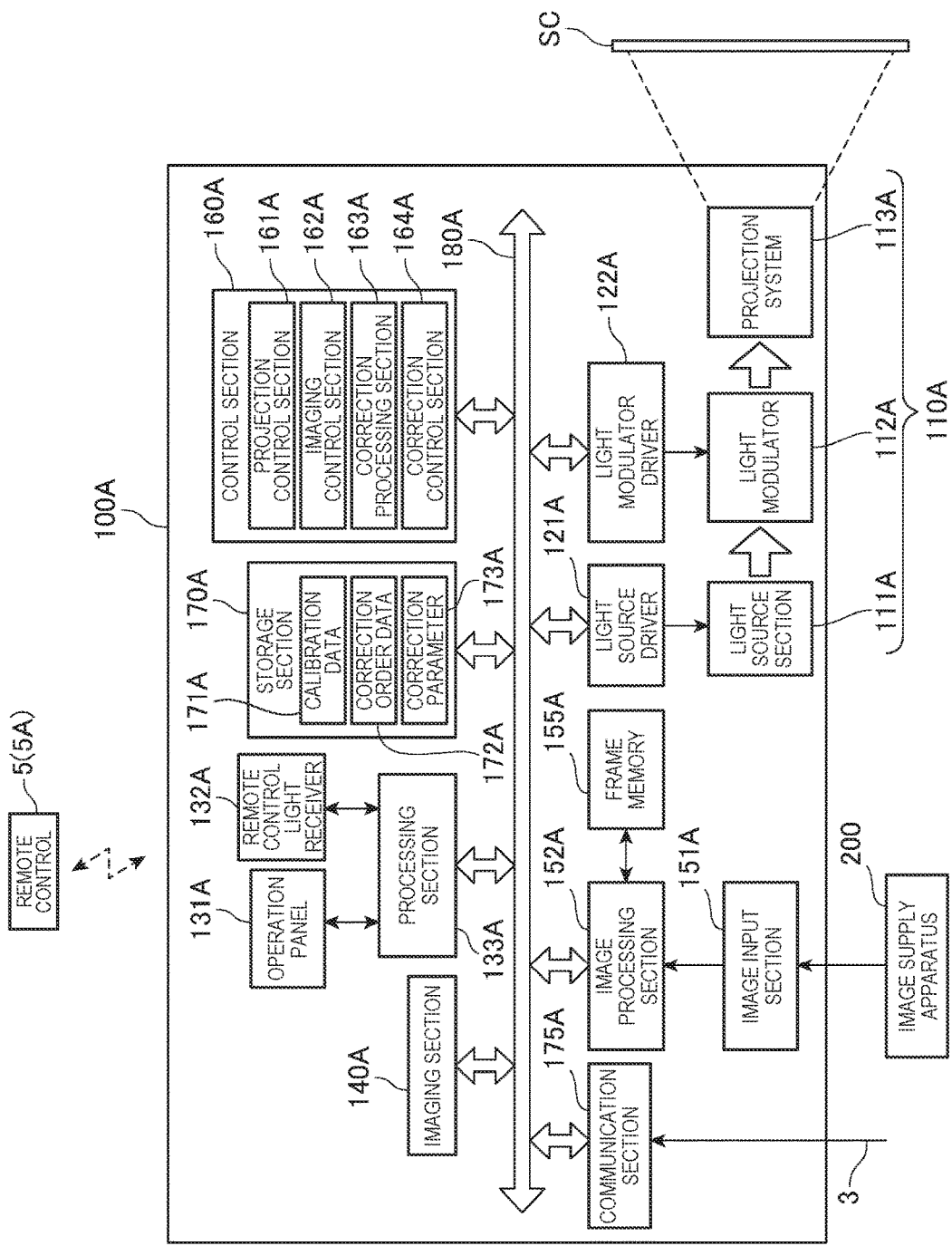
FIG. 3 is a block diagram showing a projector according to the first embodiment.

FIG. 3 is a block diagram showing the configuration of the projector 100A. The image supply apparatus 200 is connected to the projector 100A. The projector 100A projects on the screen SC an image based on image data supplied from the image supply apparatus 200 or image data stored in advance in a storage section 170A, which will be described later. The image supply apparatus 200 is, for example, a video reproduction apparatus, a DVD (digital versatile disk) reproduction apparatus, a TV tuner, a CATV (cable television) set-top box, a video game console, or any other video output apparatus, a personal computer, or any other apparatus.

The projector 100A includes an image input section 151A. The image input section 151A includes a connector to which a cable is connected and an interface circuit (neither of them is shown), and image data supplied from the image supply apparatus 200 connected via the cable is inputted to the image input section 151A. The image input section 151A outputs the inputted image data to an image processing section 152A.

The interface provided in the image input section 151A may, for example, be a data communication interface that complies with Ethernet (registered trademark), IEEE1394, USB, or any other standard. The interface of the image input section 151A may instead be an image data interface that complies with MHL (registered trademark), HDMI (registered trademark), DisplayPort, or any other standard.

The image input section 151A may include, as the connector, a VGA terminal, to which an analog video signal is inputted or a DVI (digital visual interface) terminal, to which digital video data is inputted. The image input section 151A further includes an A/D conversion circuit, and when an analog video signal is inputted to the image input section 151A via the VGA terminal, the A/D conversion circuit converts the analog video signal into image data and outputs the image data to the image processing section 152A.

The projector 100A includes a projection section 110A, which performs optical image formation and projects (displays) the first image 2A on the screen SC. The projection section 110A includes a light source section 111A, which serves as a light source, a light modulator 112A, and a projection system 113A.

The light source section 111A includes a light source, such as a xenon lamp, an ultrahigh-pressure mercury lamp, an LED (light emitting diode), or a laser light source. The light source section 111A may further include a reflector and an auxiliary reflector that guide the light emitted from the light source to the light modulator 112A. The light source section 111A may further include a lens group and a polarizer that enhance the optical characteristics of projection light, a light adjustment element that is provided on the path to the light modulator 112A and attenuates the amount of light emitted from the light source, and other components (neither of them is shown).

The light source section 111A is driven by a light source driver 121A. The light source driver 121A is connected to an internal bus 180A. The light source driver 121A supplies drive current to the light source section 111A to turn on and off the light source in the light source section 111A under the control of the control section 160A. Further, the light source section 111A may be so configured that the luminance of the light source can be adjusted by the drive current supplied by the light source driver 121A.

The light modulator 112A includes three liquid crystal panels corresponding, for example, to the three primary colors RGB. The light outputted from the light source section 111A is separated into color light fluxes of the three colors RGB, and each of the color light fluxes is incident on the corresponding liquid crystal panel. Each of the three liquid crystal panels is a transmissive liquid crystal panel and modulates light passing therethrough to generate image light. The image light fluxes having passed through the liquid crystal panels where the image light fluxes are modulated are combined with one another by a light combining system, such as a cross dichroic prism, and directed to the projection system 113A.

A light modulator driver 122A, which drives the liquid crystal panels in the light modulator 112A, is connected to the light modulator 112A. The light modulator driver 122A is connected to the internal bus 180A.

The light modulator driver 122A generates R, G, and B image signals on the basis of display image data (which will be described) inputted from the image processing section 152A. Based on the generated R, G, and B images signals, the light modulator driver 122A drives the respective liquid crystal panels in the light modulator 112A to draw images on the liquid crystal panels.

The projection system 113A includes a lens group that projects the modulated image light fluxes from the light modulator 112A toward the screen SC in such a way that the image light fluxes form images on the screen SC. The projection system 113A may further include a zoom mechanism that performs enlargement and reduction of images to be projected on the screen SC and focal point adjustment and a focus adjustment mechanism that performs focus adjustment.

The projector 100A includes an operation panel 131A and a processing section 133A. The processing section 133A is connected to the internal bus 180A.

On the operation panel 131A, which functions as a user interface, a variety of operation keys and a display screen formed of a liquid crystal panel are displayed. When any of the operation keys displayed on the operation panel 131A is operated, the processing section 133A outputs data corresponding to the operated key to the control section 160A. The processing section 133A causes the operation panel 131A to display a variety of screens under the control of the control section 160A.

A touch sensor (not shown) that detects a touch on the operation panel 131A is overlaid on and integrated with the operation panel 131A. The processing section 133A detects the position where a user's finger or any other object touches the touch sensor as an input position and outputs data corresponding to the detected input position to the control section 160A.

The projector 100A further includes a remote control light receiver 132A, which receives an infrared signal transmitted from a remote control 5A used by the user. The remote control light receiver 132A is connected to the processing section 133A.

The remote control light receiver 132A receives an infrared signal transmitted from the remote control 5A. The processing section 133A decodes the infrared signal received by the remote control light receiver 132A to produce data representing the content of the operation performed on the remote control 5A and outputs the data to the control section 160A.

The projector 100A includes an imaging section 140A. The imaging section 140A is a digital camera including an imaging system, an imaging device, an interface circuit, and other components and performs imaging under the control of the control section 160A. The direction in which the imaging section 140A performs imaging coincides with the direction in which the projection system 113A performs projection. The imaging range of the imaging section 140A, that is, the viewing angle thereof contains at least the first image 2A, which is projected through the projection system 113A, and further contains a portion around the first image 2A. The imaging section 140A performs imaging under the control of the control section 160A and outputs captured image data resulting from the imaging to the control section 160A. The imaging section 140A may include a focus mechanism, a zoom mechanism, and other mechanisms and perform focus adjustment and zoom adjustment under the control of the control section 160A or may not include any of the mechanisms or perform the focus or zoom adjustment. The imaging section 140A outputs the captured image data, for example, in an RGB format.

The projector 100A includes a communication section 175A (first communication section). The communication section 175A is an interface for data communication and is connected to the communication line 3 in the present embodiment. The communication section 175A transmits and receives a variety of data to and from the projector 100B over the communication line 3 under the control of the control section 160A. The communication section 175A can further transmit and receive a variety of data to and from each of the projectors 100C and 100D.

The present embodiment is described with reference to the configuration in which the communication section 175A is a wired interface to which the cable (not shown) that forms the communication line 3 is connected, but the configuration is presented by way of example. The communication section 175A may instead be a wireless interface that performs wireless communication that complies with wireless LAN, Bluetooth (registered trademark), or any other standard. In this case, the communication line 3 is partly or entirely formed of a wireless communication line.

Instead, the image supply apparatus 200 may be connected to each of the projectors 100A, 100B, 100C, and 100D over the communication line 3, and the image supply apparatus 200 may supply image data over the communication line 3. In this case, data communication among the projectors 100A, 100B, 100C, and 100D and data communication between the image supply apparatus 200 and each of the projectors 100A, 100B, 100C, and 100D are performed over the communication line 3.

The projector 100A includes an image processing system. The image processing system is primarily formed of the control section 160A, which oversees and controls the entire projector 100A, and further includes the image processing section 152A, a frame memory 155A, and the storage section 170A. The control section 160A, the image processing section 152A, and the storage section 170A are connected to the internal bus 180A.

The image processing section 152A loads the image data inputted from the image input section 151A into the frame memory 155A and develops the image data therein under the control of the control section 160A. The image processing section 152A carries out processes, such as resolution conversion (rescaling), resizing, distortion aberration correction, shape correction, digital zooming, and adjustment of tint and brightness of an image, on the image data developed in the frame memory 155A. The image processing section 152A carries out a process specified by the control section 160A and carries out the process by using a parameter inputted from the control section 160A as required. The image processing section 152A can, of course, carry out a combination of a plurality of the processes described above.

The image processing section 152A reads the processed image data from the frame memory 155A and outputs the read image data as display image data to the light modulator driver 122A.

The control section 160A includes a CPU, a ROM, a RAM (neither of them is shown), and other types of hardware. The ROM is a nonvolatile storage device formed of a flash ROM or any other semiconductor storage element and stores a control program executed by the CPU and a variety of data. The RAM forms a work area used by the CPU. The CPU loads the control program read from the ROM or the storage section 170A into the RAM, develops the control program in the RAM, and executes the control program developed in the RAM to control the portions of the projector 100A.

The control section 160A includes a projection control section 161A, an imaging control section 162A, and a correction processing section 163A as functional blocks. The functional blocks are achieved when the CPU executes the control program stored in the ROM or the storage section 170A.

The projection control section 161A adjusts an image display aspect in the projection section 110A and projects an image on the screen SC. The projection control section 161A controls the image processing section 152A to cause it to perform image processing on the image data inputted from the image input section 151A. In the image processing, the projection control section 161A may read a parameter necessary for the processing performed by the image processing section 152A from the storage section 170A and output the parameter to the image processing section 152A.

The projection control section 161A further controls the light source driver 121A to cause it to turn on the light source in the light source section 111A and adjust the luminance of the light source. As a result, the light source emits light, and modulated image light from the light modulator 112A is projected through the projection system 113A on the screen SC.

The imaging control section 162A causes the imaging section 140A to perform imaging and acquires captured image data.

The correction processing section 163A carries out the process of correcting the first image 2A projected by the projector 100A.

A correction control section 164A transmits a correction execution instruction and a variety of pieces of information used in the correction to the correction processing section 163A and a correction processing section 163B, which will be described later. The correction control section 164A acquires results of the correction performed by the correction processing sections 163A and 163B and controls correction performed on the entire image projected by the image projection system 1.

The image projection system 1 according to the present embodiment performs correction of the black level of the projected image 2 under the control of the correction control section 164A. The black level correction is correction for suppressing unevenness of black brightness of the projected image 2. In the projected image 2, the areas B, D, and F, which are overlapping areas, are brighter than the areas A, C, and E, which are non-overlapping areas. The correction control section 164A sets the brightest area of the black-displaying areas B, D, and F to be a reference and performs correction in which the brightness of each of the areas other than the reference area is changed to the brightness of the reference area.

The correction control section 164A transmits and receives a variety of data for performing the black level correction to and from the projectors 100B, 100C, and 100D. Since the projector 100A also performs the black level correction, the correction control section 164A transmits and receives the variety of data for performing the black level correction to and from the correction processing section 163A. That is, the correction processing section 163A and the projectors 100B, 100C, and 100D carry out a black level correction process under the control of the correction control section 164A.

The storage section 170A is a nonvolatile storage device and is achieved, for example, by a flash memory, an EPROM (erasable programmable ROM), an EEPROM (electrically EPROM), an HDD (hard disc drive), or any other storage device. The storage section 170A stores, for example, image data to be projected on the screen SC by the projection section 110A.

The storage section 170A stores calibration data 171A, correction order data 172A, and a correction parameter 173A. The calibration data 171A and the correction order data 172A are data used when the correction control section 164A performs the black level correction. The correction parameter 173A is data used when the correction processing section 163A performs the black level correction. The correction order data 172A may, for example, contain information on the positions and sizes of the areas A to G of the projected image 2, the overlapping areas out of the areas A to G, and other factors in advance.

Figure 4:
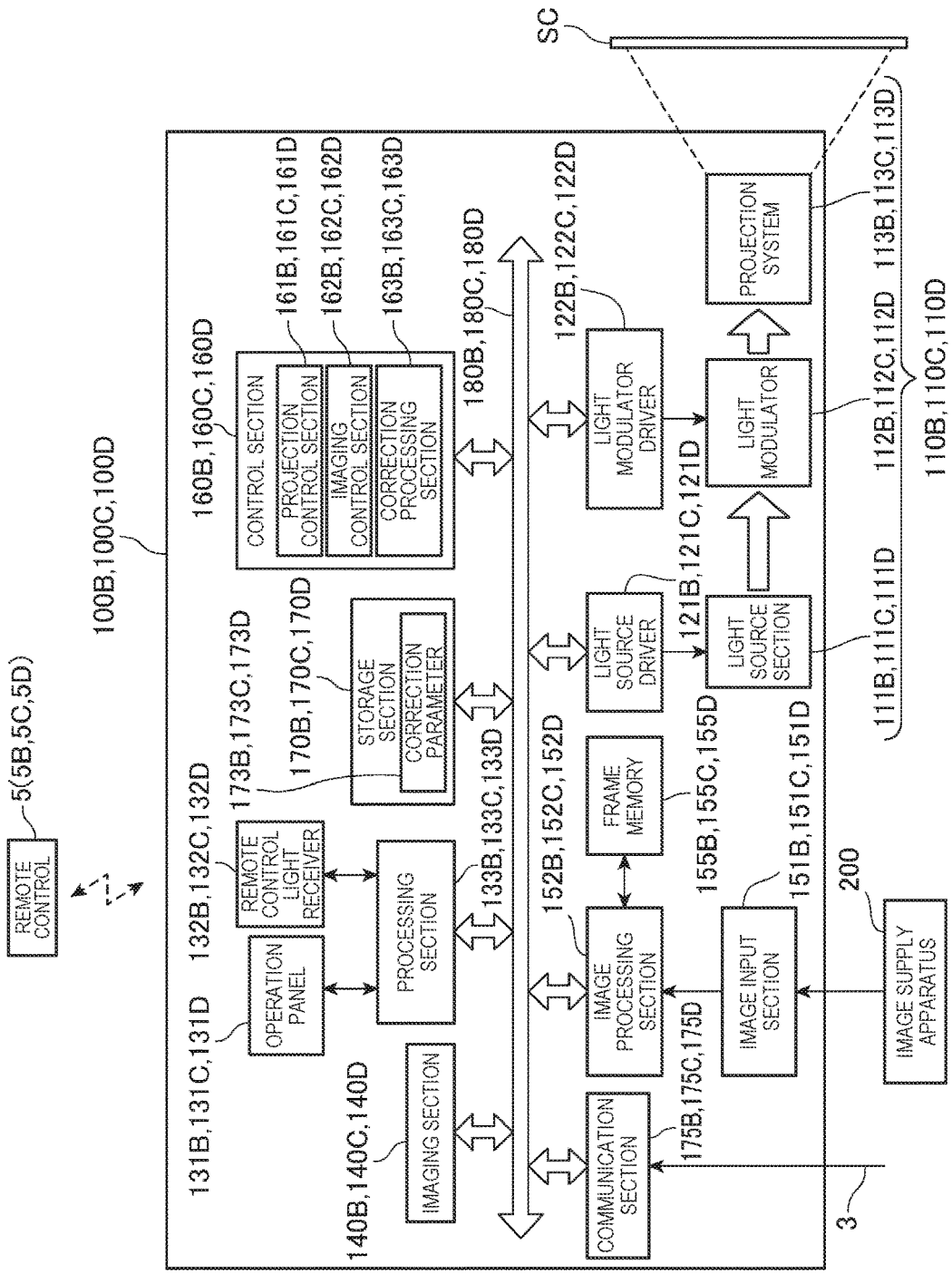
FIG. 4 is a block diagram showing another projector according to the first embodiment.

FIG. 4 is a block diagram showing the configuration of the projector 100B. Since each of the projectors 100C and 100D is an apparatus having the same configuration as that of the projector 100B, the description of the configuration of the projectors 100C and 100D is partly omitted.

The projector 100B has the same configuration as that of the projector 100A except that the functional blocks of the control section 160B, which will be described later, differ from those of the control section 160A (FIG. 3), and that data stored in a storage section 170B partly differs from the data stored in the storage section 170A (FIG. 3).

The projector 100B is connected to the image supply apparatus 200, as described above. The projector 100B includes an image input section 151B, to which the image supply apparatus 200 is connected. The image input section 151B is configured in the same manner as the image input section 151A and outputs image data inputted to the image input section 151B to an image processing section 152B.

A projection section 110B is configured in the same manner as the projection section 110A and includes a light source section 111B, which serves as a light source, a light modulator 112B, and a projection system 113B. The projection section 110B performs optical image formation and projects (displays) the second image 2B on the screen SC.

The configurations of the light source section 111B (light source), the light modulator 112B (modulation section), and the projection system 113B are the same as those of the light source section 111A, the light modulator 112A, and the projection system 113A. The light modulator 112B modulates the light outputted from the light source section 111B on the basis of image data, and the image data corresponds to second image data.

The projector 100B further includes a light source driver 121B, a light modulator driver 122B, an operation panel 131B, a remote control light receiver 132B, a processing section 133B, the image processing section 152B, a frame memory 155B, and an internal bus 180B. The sections described above have the same configurations as those of the light source driver 121A, the light modulator driver 122A, the operation panel 131A, the remote control light receiver 132A, the processing section 133A, the image processing section 152A, the frame memory 155A, and the internal bus 180A shown in FIG. 3. The remote control light receiver 132B may be configured to receive an infrared signal issued from a remote control 5B. That is, remote controls 5B, 5C, and 5D used with the projectors 100B, 100C, and 100D may be provided separately from the remote control 5A (FIG. 3). Instead, a remote control 5 that can be used commonly with the projectors 100A, 100B, 100C, and 100D may be provided.

An imaging section 140B is a digital camera including an imaging system, an imaging device, an interface circuit, and other components, as the imaging section 140A is. The imaging section 140B performs imaging under the control of the control section 160B. The direction in which the imaging section 140B performs imaging coincides with the direction in which the projection system 113B performs projection. The imaging range of the imaging section 140B, that is, the viewing angle thereof contains at least the second image 2B, which is projected through the projection system 113B, and further contains a portion around the second image 2B. The imaging section 140B performs imaging under the control of the control section 160B and outputs captured image data resulting from the imaging to the control section 160B. The imaging section 140B may include a focus mechanism, a zoom mechanism, and other mechanisms and perform focus adjustment and zoom adjustment under the control of the control section 160B or may not include any of the mechanisms or perform the focus or zoom adjustment.

Similarly, the projector 100C includes an imaging section 140C, and the projector 100D includes an imaging section 140D. Each of the imaging sections 140C and 140D is a digital camera configured in the same manner as the imaging section 140B and performs imaging and outputs captured image data under the control of imaging control sections 162C and 162D.

The imaging section 140B outputs captured image data, for example, in the RGB format. The same holds true for the imaging sections 140C and 140D.

A communication section 175B is an interface for data communication and is connected to the communication line 3 in the present embodiment. The communication section 175B transmits and receives a variety of data to and from the projector 100A over the communication line 3 under the control of the control section 160B. Further, the communication section 175B can transmit and receive a variety of data to and from each of the projectors 100C and 100D. The communication section 175B may be configured as a wireless communication interface, as in the case of the communication section 175A.

The control section 160B includes a CPU, a ROM, a RAM (neither of them is shown), and other types of hardware, as the control section 160A does. The ROM is a nonvolatile storage device formed of a flash ROM or any other semiconductor storage element and stores a control program executed by the CPU and a variety of data. The RAM forms a work area used by the CPU. The CPU loads the control program read from the ROM or the storage section 170B into the RAM, develops the control program in the RAM, and executes the control program developed in the RAM to control the portions of the projector 100B.

The control section 160B includes a projection control section 161B, an imaging control section 162B, and a correction processing section 163B as functional blocks. The functional blocks are achieved when the CPU executes the control program stored in the ROM or the storage section 170B.

The projection control section 161B adjusts an image display aspect in the projection section 110B and projects an image on the screen SC. The projection control section 161B controls the image processing section 152B to cause it to perform image processing on the image data inputted from the image input section 151B. In the image processing, the projection control section 161B may read a parameter necessary for the processing performed by the image processing section 152B from the storage section 170B and output the parameter to the image processing section 152B.

The projection control section 161B further controls the light source driver 121B to cause it to turn on the light source in the light source section 111B and adjust the luminance of the light source. As a result, the light source emits light, and modulated image light from the light modulator 112B is projected through the projection system 113B on the screen SC.

The imaging control section 162B causes the imaging section 140B to perform imaging and acquires captured image data. The imaging control section 162C causes the imaging section 140C to perform imaging and acquires captured image data. The imaging control section 162D causes the imaging section 140D to perform imaging and acquires captured image data.

The correction processing section 163B carries out the process of correcting the second image 2B projected by the projector 100B. The correction processing section 163B receives information transmitted by the projector 100A and corrects the second image 2B on the basis of the information.

The correction processing section 163C carries out the process of correcting the third image 2C projected by the projector 100C. The correction processing section 163C receives information transmitted by the projector 100A and corrects the third image 2C on the basis of the information.

The correction processing section 163D carries out the process of correcting the fourth image 2D projected by the projector 100D. The correction processing section 163D receives information transmitted by the projector 100A and corrects the fourth image 2D on the basis of the information.

Each of the storage sections 170B, 170C, and 170D is a nonvolatile storage device and is achieved, for example, by a flash memory, an EPROM, an EEPROM, an HDD, or any other storage device. The storage section 170B stores, for example, image data to be projected through the projection section 110B on the screen SC.

The storage section 170B stores a correction parameter 173B. The correction parameter 173B is data used when the correction processing section 163B performs the black level correction. The storage section 170C stores a correction parameter 173C. The correction parameter 173C is data used when the correction processing section 163C performs the black level correction. The storage section 170D stores a correction parameter 173D. The correction parameter 173D is data used when the correction processing section 163D performs the black level correction.

The black level correction performed by the image projection system 1 will be described. In the following action, any of the projectors 100A, 100B, 100C, and 100D functions as a master (control projector), and the other projections 100 function as slaves. In the present embodiment, the projector 100A is the master.

FIG. 2, which shows the projected image 2, further shows the imaging ranges over which the projectors 100A, 100B, 100C, and 100D perform imaging and which are labeled with reference characters VA to VD. The imaging range VA is the imaging range of the imaging section 140A (FIG. 3). The imaging range VB is the imaging range of the imaging section 140B (FIG. 4). The imaging range VC is the imaging range of the imaging section 140C provided in the projector 100C, and the imaging range VD is the imaging range of the imaging section 140D provided in the projector 100D.

The imaging range VA contains the first image 2A and further contains at least part of the second image 2B adjacent to the first image 2A. The imaging range VB contains the second image 2B and part of each of the first image 2A and the third image 2C adjacent to the second image 2B. The imaging range VC contains the third image 2C and further contains part of each of the second image 2B and the fourth image 2D adjacent to the third image 2C. The imaging range VD contains the fourth image 2D and further contains part of the third image 2C.

As described above, each of the projectors 100A, 100B, 100C, and 100D can capture an image of the range that is part of the projected image 2 and contains the portion projected by the projector 100 to produce captured image data.

The image projection system 1 uses the captured image data produced by each of the projectors 100A, 100B, 100C, and 100D to correct unevenness of black brightness of the projected image 2. The action described above will be described below with reference to FIGS. 5 to 8.

Figure 5:
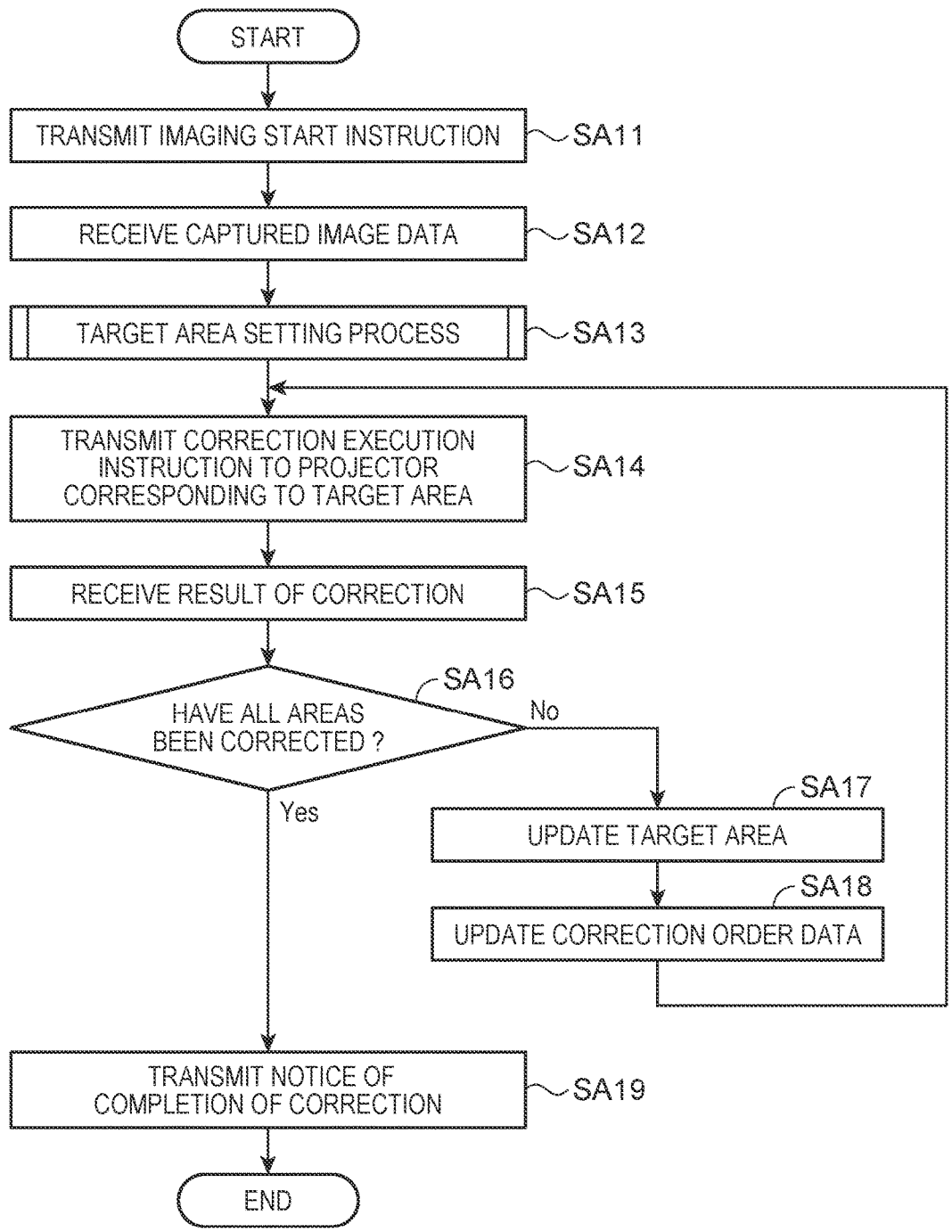
FIG. 5 is a flowchart showing the action of a projector according to the first embodiment.
Figure 6:
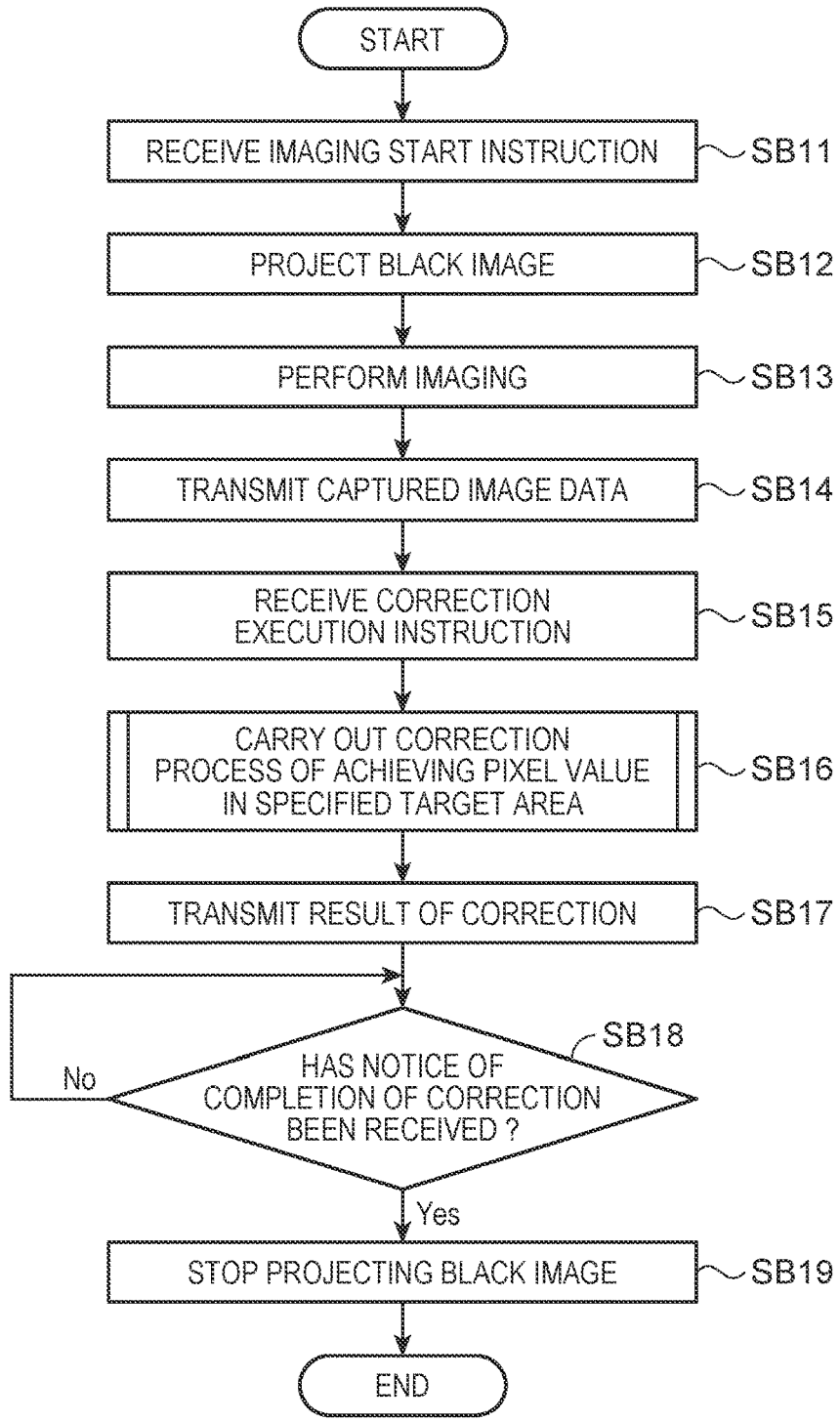
FIG. 6 is a flowchart showing the action of another projector according to the first embodiment.
Figure 7:
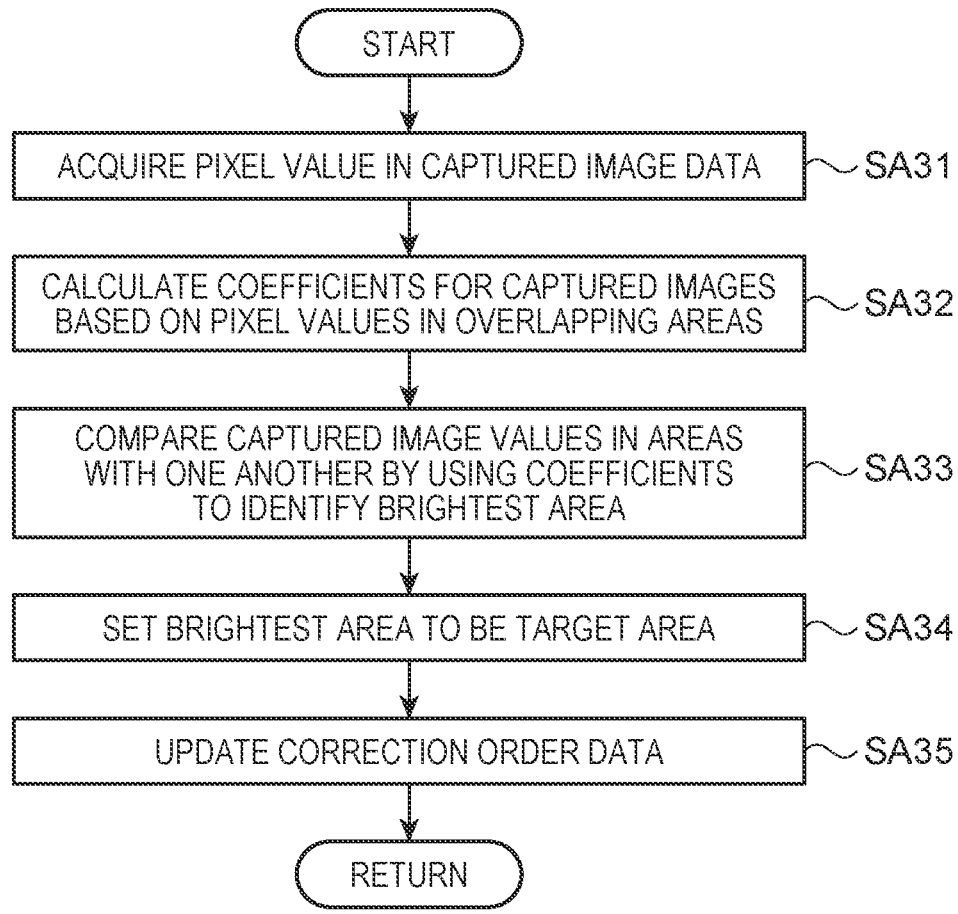
FIG. 7 is a flowchart showing the action of the projector according to the first embodiment.

FIG. 5 is a flowchart showing the action of the projector 100A. FIG. 7 is a flowchart showing step SA13 in FIG. 5 in detail. FIG. 6 is a flowchart showing the action of the projector 100B, and FIG. 8 is a flowchart showing step SB16 in FIG. 6 in detail.

Figure 8:
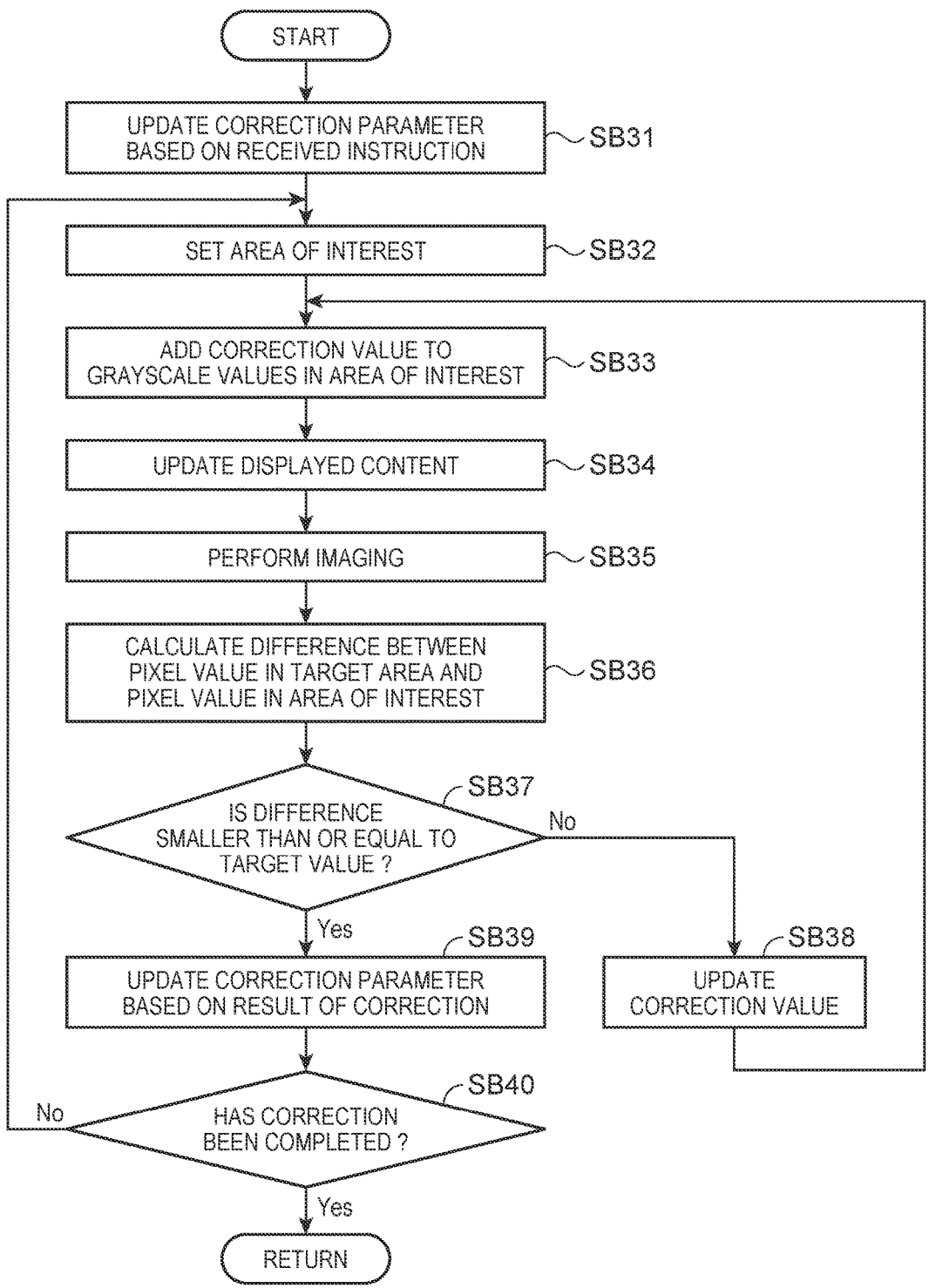
FIG. 8 is a flowchart showing the action of the other projector according to the first embodiment.

The action shown in FIGS. 6 and 8 is not limited to the action of the projector 100B, and the projectors 100C and 100D also perform the same action. Further, the imaging control section 162A and the correction processing section 163A of the projector 100A also perform the action shown in FIGS. 6 and 8, as those of the projector 100B do. That is, FIGS. 5 and 7 show the action performed by the correction control section 164A, and FIGS. 6 and 8 shows the action performed by the imaging control section 162A, the correction processing section 163A, and the control sections 160B, 160C, and 160D.

The correction control section 164A transmits an imaging start instruction (step SA11), as shown in FIG. 5. The correction control section 164A transmits and receives the instruction and other pieces of information through the communication section 175A to the projectors 100B, 100C, and 100D, and the correction control section 164A inputs and outputs instructions and other pieces of information from and to the imaging control section 162A and the correction processing section 163A inside the control section 160. The same holds true for the following description.

The correction processing section 163A and the control sections 160B, 160C, and 160D provided in the projectors 100B, 100C, and 100D receive the imaging start instruction (step SB11), as shown in FIG. 6. The correction processing sections 163B, 163C, and 164D transmit and receive instructions and other pieces of information to and from the correction control section 164A of the projector 100A via the communication sections 175B, 175C, and 175D. The same holds true for the following description.

In the following description, the action shown in FIGS. 6 and 8 will be described as the action of the control section 160B. The action of the imaging control section 162A, the correction processing section 163A, and the control sections 160C and 160D is the same as the action of the control section 160B and will therefore not be described.

The correction processing section 163B causes the light modulator 112B to draw black over the entire display area to project a black image through the projection section 110B on the basis of the instruction received in step SB11 (step SB12). For example, in the case where the light modulator 112B includes three liquid crystal panels corresponding to red (R), green (G), and blue (B), the correction processing section 163B minimizes the grayscale values of all the three liquid crystal panels. Further, in step SB12, the light source in the light source section 111B is turned on.

The imaging control section 162B then causes the imaging section 140B to perform imaging and acquires captured image data (step SB13). The imaging control section 162B transmits the captured image data to the projector 100A (step SB14).

The correction control section 164A receives and acquires the captured image data from the imaging control section 162B and the projectors 100B, 100C, and 100D (step SA12). The correction control section 164A carries out a target area setting process on the basis of the received captured image data (step SA13). The target area setting process is the process of selecting any of the areas A to G shown in FIG. 2 and setting the selected area as a "target area" in the black level correction.

The target area setting process will be described in detail with reference to FIG. 7.

The correction control section 164A acquires a pixel value in each of the areas A to G from the captured image data acquired in step SA12 (FIG. 5) (step SA31). For example, the correction control section 164A extracts a portion corresponding to the area A from the captured image data on the imaging range VA captured by the imaging section 140A and acquires the pixel value of a representative pixel contained in the area A. Instead, a computation process of determining the average, median, or any other index of the pixel values of a plurality of pixels (which may instead be the entire pixels) contained in the area A may be carried out to determine a pixel value representative of the area A. The position of the representative pixel or a method for selecting the representative pixel, or data on the computation process for determining the pixel value is, for example, contained in the calibration data 171A.

In step SA31, the correction control section 164A determines the pixel value in each of the areas A to G on the basis of the entire captured image data. That is, the correction control section 164A determines the pixel values in the area A and B from the captured image data produced by the imaging section 140A. The correction control section 164A further determines the pixel values in the areas B, C, and D from the captured image data produced by the imaging section 140B. The correction control section 164A further determines the pixel values in the areas D, E, and F from the captured image data produced by the imaging section 140C and determines the pixel values in the areas E and F from the captured image data produced by the imaging section 140D.

Further, in step SA31, among the R, G, and B pixel contained in the captured image data, the G (green) pixel value is determined. The G pixel value is useful as an index because green more strongly correlates with the brightness of an image than the other colors. Further, it is conceivable to use captured image data expressed in the XYZ color system, which is believed to be closer to the human visual characteristics than the RGB color system, but employing the configuration in which captured image data in the RGB format are outputted allows simplification and cost reduction of the imaging sections 140. Captured image data in the RGB color system is therefore used, and the G pixel value in the captured image data is employed in the present embodiment.

Let GA1 be the pixel value that represents the area A and is obtained from the captured image data produced by the imaging section 140A and GB1 be the pixel value that represents the area B and obtained therefrom.

Let GB2 be the pixel value that represents the area B and is obtained from the captured image data produced by the imaging section 140B, GC2 be the pixel value that represents the area C and is obtained therefrom, and GD2 be the pixel value that represents the area D and is obtained therefrom.

Let GD3 be the pixel value that represents the area D and is obtained from the captured image data produced by the imaging section 140C, GD3 be the pixel value that represents the area D and is obtained therefrom, and GF3 be the pixel value that represents the area F and is obtained therefrom.

Let GF4 be the pixel value that represents the area F and is obtained from the captured image data produced by the imaging section 140D and GG4 be the pixel value that represents the area G and is obtained therefrom.

Since the areas B, D, and F, which are overlapping areas, are contained in the plurality of captured image data sets, the correction control section 164A compares the pixel value in each of the overlapping areas among different captured image data sets to calculate a coefficient with respect to the captured image data sets for calibration (step SA32). Measurement errors due to the individual differences in the sensitivities of the imaging sections 140A to 140D can thus be eliminated or suppressed.

The correction control section 164A sets a calibration coefficient K1 for the imaging section 140A at 1 in step SA32. That is, the sensitivity of the imaging section 140A is used as a reference.

The correction control section 164A determines a calibration coefficient K2 for the imaging section 140B, a calibration coefficient K3 for the imaging section 140C, and a calibration coefficient K4 for the imaging section 140D by using the following Expressions (1), (2), and (3).

$$K2 = GB1/GB2 \quad (1)$$

$$K3 = (GB1/GB2)*(GD2/GD3) \quad (2)$$

$$K4 = (GB1/GB2)*(GD2/GD3)*(GF3/GF4) \quad (3)$$

The correction control section 164A applies the calibration coefficients calculated in step SA32 to the pixel values obtained from the captured image data to calculate imaged values in the areas A to G and compares the imaged values with one another (step SA33). The imaged value refers to a pixel value corrected by using a calibration coefficient. Applying the calibration coefficients allows the imaged values in the areas A to G to be determined as shown by the following Expression (4).

$$\text{Imaged value in area } A = GA1$$

$$\text{Imaged value in area } B = GB1$$

$$\text{Imaged value in area } C = GC2*K2$$

$$\text{Imaged value in area } D = GD2*K2$$

$$\text{Imaged value in area } E = GE3*K3$$

$$\text{Imaged value in area } F = GF3*K3$$

$$\text{Imaged value in area } G = GG4*K4$$

The correction control section 164A sets an area having the greatest imaged value, that is, the brightest area, of those determined in step SA33 to be a target area out of the areas A to G (step SA34). The correction control section 164A updates the correction order data 172A stored in the storage section 170A in such a way that the set area is the target area (step SA35). The correction order data 172A contains, for example, data on the order in accordance with which the correction control section 164A corrects the areas A to G. In the present embodiment, the correction order data 172A contains data that specifies an area to be set as the target area out of the areas A to G.

Referring back to FIG. 5, the correction control section 164A identifies a projector 100 corresponding to the target area, that is, a projector 100 that projects an image onto the target area and transmits a correction execution instruction to the identified projector 100 (step SA14).

In the following description, a case where the area D is set as the target area will be described by way of example. Since the area D is an area where the second image 2B and the third image 2C overlap with each other, in the case where the area D is set as the target area, the correction control section 164A transmits the correction execution instruction to the projectors 100B and 100C. The correction execution instruction transmitted by the correction control section 164A contains information that specifies the target area. The information can, for example, be information that specifies the position and size of the target area in the projected image 2 or the second image 2B and the third image 2C. The information may further contain information representing the position and size of the areas other than the area D.

The projectors 100B and 100C receive the correction execution instruction transmitted by the projector 100A (step SB15). The correction processing sections 163C and 163D carry out a correction process of correcting the third image 2C and the fourth image 2D in such a way that the images have the same pixel value as that in the target area specified by the instruction received from the projector 100A (step SB16).

The correction process will be described in the form of the action of the projector 100B with reference to FIG. 8.

The correction processing section 163B updates the correction parameter 173B on the basis of the correction instruction received from the projector 100A in such away that the target area is the area D (step SB31). The correction parameter 173B contains a variety of data associated with the correction, for example, the position and size of the target area and the positions, sizes, and number, and other factors of areas to be corrected in accordance with the target area.

The correction processing section 163B corrects the portions other than the area D in the second image 2B in accordance with the area D, which is the target area. Specifically, the correction processing section 163B corrects the areas B and C.

The correction processing section 163B selects the area B or C and sets the selected area to be an area of interest that is a target of the correction process (correction target area) (step SB32). The area of interest may be selected in an order set in advance, and an area adjacent to the target area is preferably selected as the area of interest. In this example, the area C adjacent to the target area is selected as the area of interest.

The correction processing section 163B carries out the process of adding a correction value to the grayscale value in the area C, which is the area of interest (step SB33). The grayscale value in the area C is the pixel value of the pixels in the area corresponding to the area C, which is the area of interest, in the display area of the light modulator 112B. The correction processing section 163B carries out the process of adding the correction value to image data inputted by the image processing section 152B to the light modulator 112B or an image signal in accordance with which the light modulator 112B draws an image. The correction processing section 163B may add the same correction value to R, G, and B image data or image signals or may add difference correction values thereto on a color basis. Further, in step SB33, for example, a correction value is added to the grayscale value (pixel value) of the entire pixels in the area of interest.

The correction value added in step SB33 is a default value contained as an initial correction value in the correction parameter 173B. The target area set in the target area setting process (FIG. 7) is the brightest area and is in many cases an overlapping area. An area adjacent to the target area is therefore a non-overlapping area in many cases, and the brightness of a non-overlapping area is corrected in accordance with the brightness of an overlapping area in the correction process. The initial correction value can therefore, for example, be a typical value so specified as to correct the difference in brightness between an overlapping area and a non-overlapping area.

The projection control section 161B updates the second image 2B in such a way that an image to which the correction value has been added is projected (step SB34). The imaging control section 162B causes the imaging section 140B to capture the updated second image 2B and acquires captured image data (step SB35).

The correction processing section 163B acquires the pixel value in the target area and the pixel value in the area of interest from the captured image data obtained in step SB35 and calculates the difference therebetween (step SB36). The pixel values acquired in step SB36 are pixel values of part of the pixels that form the captured image data, specifically, the pixel values of the pixels in the target area and the area of interest on which the image capturing is performed. For example, the correction processing section 163B may acquire the pixel value of a representative pixel in each of the target area and the area of interest on which the image capturing is performed or may determine the pixel values by carrying out a computation process of determining the average, median, or any other index of the pixel values of a plurality of pixels (which may instead be the entire pixels) in the target area and the area of interest on which the image capturing is performed. In this process, the correction processing section 163B may determine the pixel values of the entire R, G, and B pixels, but it is assumed in the embodiment that the G (green) pixel value is determined.

The correction processing section 163B determines a difference ΔG between the target area and the area of interest by using the following Expression (5).

$$\Delta G = (\text{pixel value } G \text{ in area of interest}) - (\text{pixel value } G \text{ in target area}) \quad (5)$$

The correction processing section 163B subsequently evaluates whether or not the difference ΔG between the target area and the area of interest is smaller than or equal to a target value (step SB37). In a case where the difference ΔG between the target area and the area of interest is smaller than or equal to the target value, the difference in brightness is naturally small, whereby the purpose of the correction has been achieved. The target value is set in advance as a reference in accordance with which the difference between the target area and the area of interest is evaluated, and is, for example, contained in the correction parameter 173B.

In a case where the difference ΔG between the target area and the area of interest is greater than the target value (No in step SB37), the correction processing section 163B updates the correction value (step SB38). The case where the difference ΔG between the target area and the area of interest is greater than the target value is a case where the following relationship is satisfied: absolute value of the difference |ΔG|>(target value).

In the case where ΔG<0 in step SB38, that is, in the case where the area of interest is dimmer than the target area (pixel value in area of interest is smaller than that in target area), the correction processing section 163B, for example, performs the computation expressed by the following Expression (6) to increase the correction value. On the other hand, in the case where ΔG>0 in step SB38, that is, in the case where the area of interest is brighter than the target area (pixel value in area of interest is greater than that in target area), the correction processing section 163B, for example, performs the computation expressed by the following Expression (7) to decrease the correction value.

$$\text{Correction value} = \text{correction value} + D \quad (6)$$

$$\text{Correction value} = \text{correction value} - D \quad (7)$$

In the expressions, D is a value set in advance as a unit that changes the correction value.

The correction processing section 163B, after it updates the correction value in step SB38, returns to step SB33, where the correction value is added to the original grayscale value in the area of interest (step SB33) and the displayed content is updated (step SB34). In step SB33, the addition is not performed by accumulating a plurality of correction values, but the correction value updated in step SB38 is added to the grayscale value before the correction.

In step SB38, the correction processing section 163B may instead reduce the value D, which is added to or subtracted from the correction value. For example, in a case where the process of updating the correction value in step SB38 is carried out at least twice on a single area of interest, a value smaller than the value D may be added to or subtracted from the correction value in Expressions (6) and (7) in the second update process and afterward.

Specifically, in a case where ΔG<0 in step SB38 and ΔG had the opposite sign (ΔG>0) in the preceding step SB38, the computation expressed, for example, by the following Expression (8) may be performed. In a case where ΔG>0 in step SB38 and ΔG had the opposite sign (ΔG<0) in the preceding step SB38, the computation expressed, for example, by the following Expression (9) may be performed. In the following Expressions (8) and (9), the correction value changes by a smaller amount. Therefore, the number of repetitions of the process in step SB38 can be reduced, but ΔG is allowed to quickly converge to a value smaller than the target value.

$$\text{Correction value} = \text{correction value} + (D/2) \qquad (8)$$

$$\text{Correction value} = \text{correction value} - (D/2) \qquad (9)$$

In a case where the difference ΔG in the pixel value between the target area and the area of interest is smaller than or equal to the target value (Yes in step SB37), the correction processing section 163B updates the correction parameter 173B in such a way that it contains the result of the correction (step SB39). The result of the correction contains the area of interest having undergone the correction and a final correction value corresponding to the area of interest.

The correction processing section 163B evaluates whether or not all areas that are areas of interest have undergone the correction (step SB40). In a case where among all the areas B, C, and D contained in the second image 2B, all the areas B and C excluding the target area have undergone the correction, the correction processing section 163B determines that the correction has been completed (Yes in step SB40) and terminates the correction process.

In a case where any of the areas B and C excluding the target area has not undergone the correction, the correction processing section 163B returns to step SB32, where an area of interest is newly set (step SB32). In this process, the correction processing section 163B sets the area of interest having undergone the correction to be the following target area and sets an area adjacent to the set target area to be the new area of interest. As a result, each area in the second image 2B is sequentially selected with respect to the target area initially set by the correction control section 164A as a start point, and the selected area is then corrected.

In step SB38, in a case where the correction value becomes zero as a result of the update of the correction value, the correction processing section 163B may terminate the correction performed on the area of interest being selected. An upper limit may instead be provided to limit the number of times of execution of the action in step SB38. In this case, the upper limit of the number of times of execution of the action in step SB38 is set in advance and contained, for example, in the correction parameter 173B. The correction processing section 163B counts the number of times of the update of the correction value in step SB38 for each area of interest. When a result of the evaluation in step SB37 shows that the difference ΔG between the target area and the area of interest is greater than the target value (No in step SB37), the correction processing section 163B may evaluate whether or not the number of times of the update of the correction value in the area of interest has reached the upper limit. When a result of the evaluation shows that the number of times of the update of the correction value in the area of interest has reached the upper limit, the correction processing section 163B proceeds to step SB39, where the correction value is finalized by using the default value initially set in step SB33. In a case where the number of times of the update of the correction value in the area of interest has not reached the upper limit, the correction processing section 163B proceeds to step SB38, as described above. In this case, in a case where the correction value does not converge, the correction process can be terminated in an appropriate state for suppression of the period required for the correction process.

Instead, an upper limit of the correction value may be set. In this case, the correction processing section 163B may evaluate whether or not the correction value has reached the upper limit as a result of the addition of a value to the correction value by using Expression (6) or (8) described above in step SB38. When a result of the evaluation shows that the correction value has reached the upper limit, the correction processing section 163B updates the correction value to the upper limit. In this case, a situation in which the brightness of the projected image 2 displayed in black is excessively bright can be avoided in the correction process.

Referring back to FIG. 6, the correction processing section 163B transmits a result of the correction process in step SB16 to the projector 100A (step SB17). In the description, a result containing information representing the areas B and C having undergone the correction in accordance with the area D is transmitted. The correction processing section 163B then evaluates whether or not the projector 100A has transmitted a notice of completion of the correction (step SB18). In a case where no notice has been received (No in step SB18), the correction processing section 163B waits until it receives the notice.

The correction control section 164A receives a result of the correction from each of the projectors 100B, 100C, and 100D or the correction processing section 163A (step SA15) and acquires information representing a corrected area from the received result of the correction. The correction control section 164A evaluates whether or not all the areas A to G of the projected image 2 have been corrected (step SA16). In a case where there is an area that has not been corrected (No in step SA16), the correction control section 164A updates the target area (step SA17). The correction control section 164A sets an area adjacent to the area that has not been corrected and having been corrected to be the target area. The correction control section 164A then updates the correction order data 172A in such a way that the setting of the updated target area is reflected (step SA18) and returns to step SA14.

For example, it is assumed in step SA16 that a correction result representing that the areas B and C of the second image 2B have been corrected is received from the projector 100B. In this case, the correction control section 164A sets the area B to be the target area (step SA17) and transmits an instruction of correction of the first image 2A with the area B being the target area to the correction processing section 163A (step SA14).

In a case where the correction control section 164A determines that the areas A to G of the projected image 2 have been corrected (Yes in step SA16), the correction control section 164A transmits a notice of completion of the correction to the projectors 100B, 100C, and 100D and the correction processing section 163A (step SA19) and terminates the correction process.

The correction processing section 163B, when it receives the notice of completion of the correction (Yes in step SB18), stops projection of the black image initiated in step SB12 (step SB19) and terminates the correction process. Each of the projectors 100A, 100B, 100C, and 100D can then perform normal action of projecting an image on the basis of image data inputted from the image supply apparatus 200.

As described above, the image projection system 1 according to the embodiment to which the invention is applied is an image projection system 1 in which a plurality of projectors 100 project images. Each of the projectors 100 includes the projection section 110, which projects an image, and the imaging section 140, which captures an image of the range containing at least part of the image projected by the projection section 110 and part of the images projected by the other projectors. Each of the projectors 110 further includes the correction processing section 163, which corrects, in accordance with a target area, a correction target area set in an area other than the target area in the projected image, the target area set, on the basis the image captured by the imaging section 140, in the image projected by the projection section 110.

Instead, each of the projectors 100 includes the projection section 110, which projects an image, and the imaging section 140, which captures an image of the range containing at least part of the image projected by the projection section 110 and part of the images projected by the other projectors. Each of the projectors 110 further includes the correction processing section 163, which corrects, in accordance with a target area, the area other than the target area in the projected image, the target area set, on the basis the image captured by the imaging section 140, in the image projected by the projection section 110.

According to the configuration of the image projection system 1 and the method for controlling the image projection system 1, each of the projectors 100 can correct a projected image, so that the process of specifying a reference value on the basis of the entire images projected by the plurality of projectors 100 or any other process is not required. Further, the correction performed by using a captured image containing an image projected by the projection section 110 and part of images projected by the other projectors 100 allows the quality of the image projected by the projection section to be so corrected as to match with those of the images projected by the other projectors. The qualities of the images projected by the plurality of projectors are therefore allowed to match with one another with no need to capture the entire images projected by the plurality of projectors but by causing the projectors to appropriately correct the projected images.

The correction processing section 163 compares the imaged value in the target area in a captured image with the imaged value in the correction target area in the captured image to determine a correction value used to correct the correction target area. The comparison between the imaged values in the captured image readily allows the qualities of the images projected by the plurality of projectors to be so corrected as to match with one another.

Further, the correction target area corrected by the correction processing section 163 of a projector 100 is set to be the following target area, and the correction processing section 163 corrects the correction target area in accordance with the set target area. The qualities of the entire images projected by the plurality of projectors are therefore allowed to match with one another with no need to capture the entire images projected by the plurality of projectors but by setting the corrected correction target area to be the target area and then performing the correction.

The projectors 100A, 100B, 100C, and 100D are so arranged that the first image 2A, the second image 2B, the third image 2C, and the fourth image 2D are combined with one another to form the projected image 2 on the screen SC. One of the projectors 100 functions as a master. The projector 100A, which is the master, includes the correction control section 164A, which sets an area regarded as the target area in the projected image 2 on the basis of images captured by the imaging sections 140A, 140B, 140C, and 140D. The qualities of the projected images can therefore be so corrected as to match with one another with no need to use a camera or any other device that captures the entire projected image 2 all at once. Unevenness in color and brightness of the projected image 2 can thus be reduced.

Further, the correction processing section 163 of at least one of the projectors 100 corrects the brightness of the area other than the target area in the projected image in accordance with the target area set by the correction control section 164A of the control projector 100A. The target area in the projected image 2 can therefore be appropriately set on the basis of images captured by the plurality of projectors 100.

The image projection system 1 includes the projector 100A, which projects the first image 2A, and the projector 100B, for example, as the second projector. The projector 100A corrects the first image 2A on the basis of an image captured by the imaging section 140A and showing a range containing at least part of the first image 2A and part of the second image 2B and with reference to a target area contained in the imaging range. The projector 100B corrects the second image 2B on the basis of an image captured by the imaging section 140B and showing a range containing part of the first image 2A and at least part of the second image 2B and with reference to the target area. Each of the projectors 100A and 100B can therefore correct an image projected by the projector on the basis of the captured image. The first image 2A and the second image 2B can therefore be appropriately corrected with no need to capture the entire projected image 2. Further, since the projectors 100A and 100B perform the correction with reference to the target area, the qualities of the first image 2A and the second image 2B can be so corrected as to match with each other. Further, the projector 100A and the projectors 100C and 100D, each of which acts as the second projector, can correct the entire projected image 2.

The control section 160A compares the imaged value in a target area in the first image 2A with the imaged value in an area of interest set in an area other than the target area in the first image 2A to determine a correction value used to correct the area of interest. Correction that achieves uniform quality over the projected image 2 can therefore be readily performed.

The control section 160B compares the imaged value in a target area in the second image 2B with the imaged value in an area of interest set in an area other than the target area in the second image 2B to determine a correction value used to correct the area of interest. Correction that achieves uniform quality over the projected image 2 can therefore be readily performed.

The projector 100A further includes the communication section 175A. The control section 160A compares an image captured by the imaging section 140A with an image captured by the imaging section 140B to set a target area. The control section 160A transmits information representing the target area to the other projectors 100. As described above, the projector 100A can compare a plurality of captured images with one another to set a target area, and each of the projectors 100A, 100B, 100C, and 100D can correct projected images with reference to the target area. The plurality of captured images can thus be used to efficiently achieve uniform quality over the projected image 2.

The control section 160A sets each of areas of interest corrected by the control sections 160A, 160B, 160C, and 160D to be a target area. Correction that achieves uniform quality over the projected image 2 can therefore be performed with no need to capture the entire projected image 2.

The second projector 100 includes the projection section 110B, which includes the light source section 111B and the light modulator 112B, which modulates the light emitted from the light source to generate image light that forms the second image 2B. The control section 160B corrects image data in such a way that the brightness of the image light generated by the light modulator 112B is corrected with reference to a target area contained in the imaging range of the imaging section 140B. The brightness of the second image 2B can therefore be appropriately corrected.

The control section 160B may further correct the image data in such a way that the color of the image light generated by the light modulator 112B is corrected with reference to the target area contained in the imaging range of the imaging section 140B.

As the third projector, the projector 100C, for example, causes the imaging section 140C to capture an image of a range containing at least part of the third image 2C and at least one of part of the first image 2A and part of the second image 2B. The projector 100C corrects the third image 2C on the basis of the captured image and with reference to a target area contained in the imaging range of the imaging section 140C. The projector 100A includes the communication section 175A, which transmits information to the projectors 100B and 100C. The control section 160A compares images captured by the imaging sections 140A, 140B, and 140C with one another to set a target area, and in a case where the set target area is contained in the second image 2B, the control section 160A transmits information representing the target area to the projector 100B. In a case where the target area is contained in the third image 2C, the control section 160A transmits information representing the target area to the projector 100C. In a case where the set target area is contained in the first image 2A, the control section 160A corrects the first image 2A with reference to the target area. As a result, the three projectors 100A, 100B, and 100C can correct the first image 2A, the second image 2B, and the third image 2C on the basis of the captured images. Uniform quality over the projected image 2 can therefore be achieved with no need to capture the entire projected image 2 but by appropriate correction of the images projected by the projectors 100.

Further, since each of the projectors 100A, 100B, 100C, and 100D includes the imaging section 140 and corrects a projected image based on a captured image, each of the projectors 100 can correct the projected image in accordance with the images projected by the other projectors 100.

Second Embodiment

Figure 9:
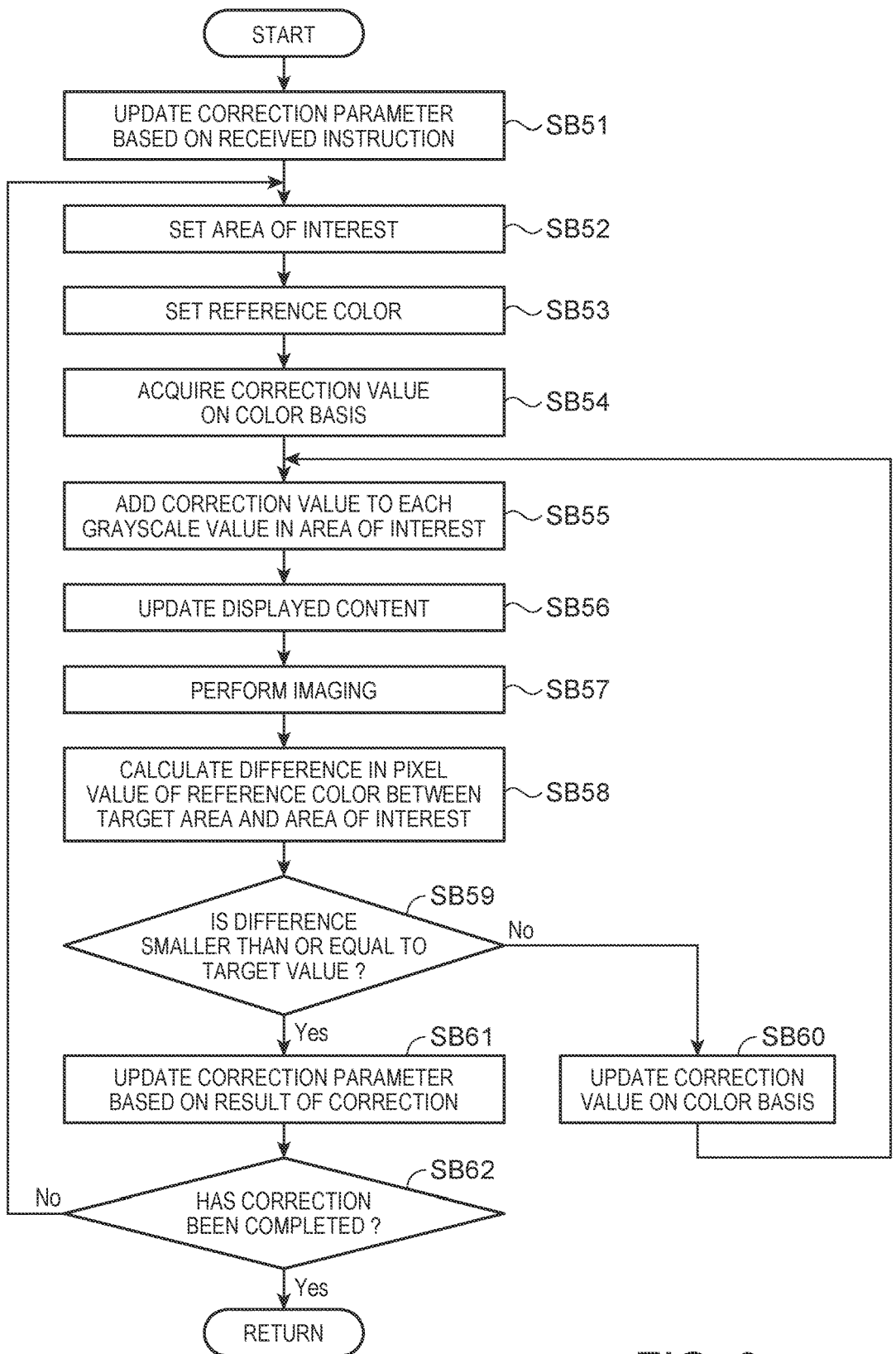
FIG. 9 is a flowchart showing the action of a projector according to a second embodiment.

FIG. 9 is a flowchart showing the action of one of the projectors 100 in an image projection system 1 according to a second embodiment to which the invention is applied. The second embodiment shows another example of the action of the image projection system 1, and the configuration of each portion of the image projection system 1 is the same as that in the first embodiment.

FIG. 9 shows the action performed in place of the correction process shown in FIG. 8. That is, FIG. 9 shows another example of the action performed by the correction processing section 163B shown in FIG. 8. The action shown in FIGS. 5 to 7 performed in conjunction with the action shown in FIG. 9 is also performed in the second embodiment.

The action shown in FIG. 9 is the action performed by the projectors 100B, 100C, and 100D and the correction processing section 163A. The following description will be made with reference to a case where the action is performed by the correction processing section 163B by way of example.

In the action shown in FIG. 9, the correction processing section 163B updates the correction parameter 173B on the basis of a correction instruction received from the projector 100A in such a way that the area D is the target area (step SB51), as in step SB31.

The correction processing section 163B corrects the portion other than the area D in the second image 2B in accordance with the area D, which is the target area. Specifically, the correction processing section 163B corrects the areas B and C. The correction processing section 163B selects the area B or C and sets the selected area to be an area of interest that is a target of the correction process (step SB52), as in step SB32.

The action shown in FIG. 9 is action of performing color correction by the correction processing section 163B that allows the color in the area of interest to match with the color in the target area. More specifically, the color correction is performed by adding or subtracting a correction value to or from the R, G, and B grayscale values.

In the action shown in FIG. 9, the correction control section 164A of the projector 100A sets a target area in the projected image 2 on the basis of the action in step SA13 (FIG. 5). The target area is set by the correction control section 164A on the basis of a captured image showing the state in which each of the projectors 100A, 100B, 100C, and 100D projects a black image. The second embodiment therefore provides an effect of reducing a difference in color in the projected image 2 and, in particular, allows correction of a difference in black tone.

The correction processing section 163B determines the difference in color between the area of interest and the target area to set a color that serves as a reference in the correction (step SB53). In step SB53, the correction processing section 163B acquires pixel values in the area of interest and the target area on a color basis and calculates the difference in the pixel value among the three colors R, G, and B by using the following Expression (10).

$$\Delta R = (R \text{ in area of interest}) - (R \text{ in target area})$$

$$\Delta G = (G \text{ in area of interest}) - (G \text{ in target area})$$

$$\Delta B = (B \text{ in area of interest}) - (B \text{ in target area}) \quad (10)$$

The correction processing section 163B compares the difference $\Delta R$ in the R pixel value, the difference $\Delta G$ in the G pixel value, and the difference $\Delta B$ in the B pixel value with one another to set the color having the greatest difference in the pixel value as the reference color.

For example, in a case where $|\Delta R| > |\Delta G|, |\Delta B|$, R is set as the reference color.

The pixel value acquired in step SB53 on a color basis is the pixel value of each of the R, G, and B pixels in the area of interest and the target area on which the image capturing is performed among the pixels that form the captured image data. For example, the correction processing section 163B may acquire the pixel value of a representative pixel in each of the target area and the area of interest on which the image capturing is performed or may determine the pixel values by carrying out a computation process of determining the average, median, or any other index of the pixel values of a plurality of pixels (which may instead be the entire pixels) in the target area and the area of interest on which the image capturing is performed.

The correction processing section 163B acquires a correction value on a color basis (step SB54). That is, the correction processing section 163B acquires a correction value used to correct the R grayscale value, a correction value used to correct the G grayscale value, and a correction value used to correct the B grayscale value. A correction value used when step SB54 is carried out for the first time is a default value contained as an initial correction value contained in the correction parameter 173B. The initial correction value can, for example, be a value small enough not to cause an extreme change in color.

The correction processing section 163B adds the correction values to the grayscale values of the three colors in the area C, which is the area of interest (step SB55). In step SB55, the correction values are added to the R, G, and B grayscale values in the area C. In step SB55, for example, the correction values are added to the grayscale values of all the pixels in the target area.

The projection control section 161B updates the second image 2B in such a way that an image after the correction values are added is projected (step SB56). The imaging control section 162B causes the imaging section 140B to capture the updated second image 2B to acquire captured image data (step SB57).

The correction processing section 163B acquires the pixel value in the target area and the pixel value in the area of interest from the captured image data obtained in step SB57 and calculates the difference in the pixel values of the reference color set in step SB53 (step SB58). The pixel values acquired in step SB58 are pixel values of part of the pixels that form the captured image data, specifically, the pixel values of the pixels in the target area and the area of interest on which the image capturing is performed, and the correction processing section 163B may acquire the pixel value of a representative pixel in each of the target area and the area of interest on which the image capturing is performed. The correction processing section 163B may instead determine the pixel values by carrying out a computation process of determining the average, median, or any other index of the pixel values of a plurality of pixels (which may instead be the entire pixels) in the target area and the area of interest on which the image capturing is performed. In this example, since R is set as the reference color, the difference in the pixel value of the reference color between the target area and the area of interest can be determined as $\Delta R$ by using the following Expression (11).

$$\Delta R = (\text{pixel value } R \text{ in area of interest}) - (\text{pixel value } R \text{ in target area}) \qquad (11)$$

The correction processing section 163B subsequently evaluates whether or not the difference $\Delta R$ for the reference color between the target area and the area of interest is smaller than or equal to a target value (step SB59). In a case where the difference $\Delta R$ for the reference color between the target area and the area of interest is smaller than or equal to the target value, the difference in color is naturally small, whereby the purpose of the correction has been achieved. The target value is set in advance as a reference in accordance with which the difference between the target area and the area of interest is evaluated, and is, for example, contained in the correction parameter 173B.

In a case where the difference $\Delta R$ for the reference color between the target area and the area of interest is greater than the target value (No in step SB59), the correction processing section 163B updates the correction value (step SB60). The case where the difference $\Delta R$ between the target area and the area of interest is greater than the target value is a case where the following relationship is satisfied: absolute value of the difference $|\Delta R|$>(target value).

In the case where $\Delta R<0$ in step SB60, that is, in the case where the reference color in the area of interest is weaker than that in the target area (pixel value in area of interest is smaller than that in target area), the correction processing section 163B, for example, performs the computation expressed by the following Expression (12) to increase the correction value for the color R but decrease the correction values for the other colors G and B.

On the other hand, in the case where $\Delta R>0$ in step SB60, that is, in the case where the reference color in the area of interest is stronger than that in the target area (pixel value in area of interest is greater than that in target area), the correction processing section 163B, for example, performs the computation expressed by the following Expression (13). According to the computation expressed by Expression (13), the correction value for the color R is changed to a smaller value, and the correction values for the other colors G and B are changed to greater values.

In the following Expressions (12) and (13), D1, D2, and D3 are each a value set in advance as a unit that changes the correction values for the colors R, G, and B.

$R$ correction value=$R$ correction value+$D1$ $G$ correction value=$G$ correction value-$D2$ $B$ correction value=$B$ correction value-$D3$ \qquad (12)

$R$ correction value=$R$ correction value-$D1$ $G$ correction value=$G$ correction value+$D2$ $B$ correction value=$B$ correction value+$D3$ \qquad (13)

The correction processing section 163B, after it updates the correction value in step SB60, returns to step SB55, where the correction values are added to the original grayscale values in the area of interest (step SB55) and the displayed content is updated (step SB56). In step SB55, the addition is not performed by accumulating a plurality of correction values, but the correction values updated in step SB60 are added to the grayscale values before the correction.

In step SB60, the correction processing section 163B may instead reduce the value D, which is added to or subtracted from the correction value. For example, in a case where the process of updating the correction value in step SB60 is carried out at least twice on a single area of interest, values smaller than the values D1, D2, and D3 may be added to or subtracted from the correction values in Expressions (12) and (13) in the second update process and afterward.

Specifically, in a case where $\Delta R<0$ in step SB59 and the sign (positive or negative) of the difference in the grayscale value of the reference color was the opposite ($\Delta R>0$) in the preceding step SB59, the computation expressed, for example, by the following Expression (14) may be performed. Similarly, in a case where $\Delta R>0$ in step SB59 and the difference had the opposite sign ($\Delta R<0$) in the preceding step SB59, the computation expressed, for example, by the following Expression (15) may be performed. In the following Expressions (14) and (15), each of the correction values changes by a smaller amount. Therefore, the number of repetitions of the process in step SB60 can be reduced, but the difference in each color is allowed to quickly converge to a value smaller than the target value.

$$R \text{ correction value} = R \text{ correction value} + (D1/2)$$

$$G \text{ correction value} = G \text{ correction value} - (D2/2)$$

$$B \text{ correction value} = B \text{ correction value} - (D3/2) \quad (14)$$

$$R \text{ correction value} = R \text{ correction value} - (D1/2)$$

$$G \text{ correction value} = G \text{ correction value} + (D2/2)$$

$$B \text{ correction value} = B \text{ correction value} + (D3/2) \quad (15)$$

In a case where the difference ΔR in the pixel value of the reference color between the target area and the area of interest is smaller than or equal to the target value (Yes in step SB59), the correction processing section 163B updates the correction parameter 173B in such a way that it contains the result of the correction (step SB61). The result of the correction contains the area of interest having undergone the correction and final correction values corresponding to the area of interest.

The correction processing section 163B evaluates whether or not all areas that are areas of interest have undergone the correction (step SB62). In a case where among all the areas B, C, and D contained in the second image 2B, all the areas B and C excluding the target area have undergone the correction, the correction processing section 163B determines that the correction has been completed (Yes in step SB62) and terminates the correction process.

In a case where any of the areas B and C excluding the target area has not undergone the correction, the correction processing section 163B returns to step SB52, where an area of interest is newly set (step SB52). In this process, the correction processing section 163B sets the area of interest having undergone the correction to be the following target area and sets an area adjacent to the set target area to be the new area of interest. As a result, each area in the second image 2B is sequentially selected with respect to the target area initially set by the correction control section 164A as a start point, and the selected area is then corrected.

In step SB60, in a case where the correction value for any one of the colors or the correction values for two of the colors become zero as a result of the update of the correction values, the correction processing section 163B may terminate the correction performed on the area of interest being selected. An upper limit may instead be provided to limit the number of times of execution of the action in step SB60, as in step S38 in FIG. 8. Instead, an upper limit of each of the corrections value may be set.

According to the action in the second embodiment, the difference in color in the projected image 2 can be corrected without use of captured image data produced by capturing the entire projected image 2.

The image projection system 1 may perform the action shown in FIG. 9 in place of the action shown in FIG. 8. In the action shown in FIG. 9, the R, G, and B grayscale values are corrected. As a result, the black brightness of the area of interest is so corrected as to match with that in the target area. Both the black level correction and the color tone matching correction are performed, whereby a high-quality projected image 2 can be projected.

Further, the image projection system 1 may perform the action shown in FIGS. 5, 6, 7, and 9 after performing the action shown in FIGS. 5 to 8. In this case, the color tone correction can be performed after the black level correction.

The first and second embodiments described above are preferable embodiments of the invention. The invention is, however, not limited thereto, and a variety of changes can be made thereto to the extent that the changes do not depart from the substance of the invention. For example, in the first embodiment described above, the correction processing sections 163A, 163B, 163C, and 163D carry out the process of correcting the grayscales in image data, but not necessarily in the invention, and the luminance of the light source may be adjusted on the basis of a correction value. In this case, the light source section 111 may be configured to include, for example, a solid-state light source, and PWM control may be performed on the luminance.

Further, for example, in the image projection system 1, the projector 100A may be connected to the projectors 100B, 100C, and 100D in an arbitrary form. For example, the projector 100A may instead be connected to each of the projectors 100B, 100C, and 100D in a one-to-one form. Still instead, the projectors 100A, 100B, 100C, and 100D may be connected to each other in a daisy chain form.

The above first and second embodiments have been described with reference to the case where the area D located at the center of the projected image 2 is set as a target area byway of example. Instead, another area in the projected image 2 may be set as a target area with no limitation. Further, the case described with reference to FIGS. 5 to 9 is presented only by way of example, and any of the other projectors 100 that form the image projection system 1 can, of course, perform the action shown in FIGS. 5 to 9. Moreover, in a case where the action shown in FIG. 9 is performed subsequently to the action shown in FIG. 8, an area specified by operation performed on the remote control 5 may be set as a target area.

Further, the action shown in FIGS. 5 and 7 and performed by the correction control section 164A of the projector 100A may be performed by an apparatus other than the projectors 100. For example, a personal computer or any other apparatus so connected to each of the projectors 100A, 100B, 100C, and 100D that data communication can be established among them may receive captured image data from the projectors 100A, 100B, 100C, and 100D and perform the processes described above.

The first and second embodiments have been described with reference to the case where each of the projectors 100A and 100B is a liquid crystal projector using transmissive liquid crystal panels, and each of the projectors 100A and 100B may instead be a projector using reflective liquid crystal panels or digital mirror devices.

Each of the functional portions of the projectors 100A and 100B shown in FIGS. 3 and 4 represents a functional configuration achieved by cooperation between hardware and software and is not necessarily implemented in a specific form. Therefore, hardware corresponding to each of the functional portions is not necessarily implemented, and a single processor that executes a program can, of course, achieve the functions of the plurality of functional portions. Further, in the embodiments described above, part of the functions achieved by software may be achieved by hardware, or part of the functions achieved by hardware may be achieved by software.

What is claimed is:

1. An image projection system in which a plurality of projectors project images and have a plurality of cameras provided thereto, wherein each projector includes a lens group that projects an image, a respective camera of the plurality of cameras, wherein the camera captures an image of a range containing at least part of the image projected by the lens group and part of an image projected by another one of the projectors, and a processor that corrects, in accordance with a target area set in the image projected by the lens group, a correction target area set in an area other than the target area in the projected image, based on the image captured by the camera such that a brightness of the correction target area is changed to a brightness of the target area set in the image projected by the lens group when the lens group projects a black image as the image, wherein the target area is an overlapping area in which the part of the image projected by the lens group of at least one of the projectors and the part of the image projected by the other one of the projectors overlap, the plurality of projectors includes a first projector, the first projector receives the captured images captured by the cameras provided to each of the remaining projectors of the plurality of projectors, the first projector compares all of the captured images to determine an area of highest brightness as the target area, and the first projector transmits information regarding the target area to the remaining projectors for correcting brightness of the images projected by the remaining projectors.

2. The image projection system according to claim 1, wherein the processor compares an imaged value in the target area in the captured image with an imaged value in the correction target area in the captured image to determine a correction value used to correct the correction target area.

3. The image projection system according to claim 1, wherein the correction target area corrected by the processor is set to be the target area, and the processor corrects the correction target area in accordance with the set target area.

4. The image projection system according to claim 1, wherein the images are black images, and correction performed by the processor is black level correction.

5. The image projection system according to claim 1, wherein data of the captured image is output as RGB data, and the processor uses a G pixel value of the RGB data to calculate the correction.

6. The image projection system according to claim 5, wherein the processor of the first projector determines a ΔG between the G pixel value of the target area and the G pixel value of the correction target area, in response to the ΔG being smaller than or equal to a target value, the processor of the first projector determines that correction is completed, and in response to the ΔG being greater than the target value, the processor of the first projector updates a correction value used to correct the correction target area.

7. The image projection system according to claim 1, wherein the processor of the first projector performs a separate calculation for calibration coefficients for each of the remaining projectors, the calibration coefficients being transmitted as part of the information regarding the target area in order to suppress a difference in brightness among the images projected by the plurality of projectors.

8. An image projection system comprising a first projector that projects a first image and a second projector that projects a second image, wherein the first projector includes a first processor that corrects the first image based on a first captured image produced by a first camera provided to the first projector capturing an image of a range containing at least part of the first image and part of the second image and with reference to a target area contained in the range over which the first captured image is captured, the target area being an area having highest brightness, among the range containing at least part of the first image and part of the second image, and the second projector includes a second processor that corrects the second image based on a second captured image produced by a second camera provided to the second projector capturing an image of a range containing part of the first image and at least part of the second image and with reference to the target area contained in the range over which the second captured image is captured, wherein the first projector receives the second captured image captured by the second camera provided to the second projector, the first projector compares the first captured image and the second captured image to determine an area of highest brightness as the target area, and the first projector transmits information regarding the target area to the second projector for correcting brightness of the image projected by the second projector.

9. The image projection system according to claim 8, wherein the first processor compares an imaged value in the target area in the first captured image with an imaged value in a correction target area set in an area other than the target area in the first image to determine a correction value used to correct the correction target area.

10. The image projection system according to claim 8, wherein the second processor compares an imaged value in the target area in the second captured image with an imaged value in a correction target area set in an area other than the target area in the second image to determine a correction value used to correct the correction target area.

11. The image projection system according to claim 8, wherein the first projector transmits information to the second projector, and the first processor compares the first captured image with the second captured image to set the target area and causes transmission of information representing the target area to the second projector.

12. The image projection system according to claim 11, wherein the first processor sets a correction target area corrected by the first processor or a correction target area corrected by the second processor to be the target area.

13. The image projection system according to claim 8, wherein the second projector includes a light source and a modulator that modulates light emitted from the light source based on second image data to generate image light that forms the second image, and the second processor corrects the second image data in such a way that brightness of the image light generated by the modulator is corrected with reference to the target area contained in the range over which the second captured image is captured.

14. The image projection system according to claim 13, wherein the second processor corrects the second image data in such a way that color of the image light generated by the modulator is corrected with reference to the target area contained in the range over which the second captured image is captured.

15. The image projection system according to claim 8, further comprising a third projector that projects a third image, wherein the third projector includes a third processor that corrects the third image based on a third captured image produced by capturing an image of a range containing at least part of the third image and at least one of part of the first image and part of the second image and with reference to a target area contained in the range over which the third captured image is captured, the first projector transmits information to the second projector and the third projector, the first processor of the first projector compares the first captured image, the second captured image, and the third captured image with one another to set the target area, in a case where the set target area is contained in the second captured image, the first processor transmits information representing the target area to the second projector, in a case where the set target area is contained in the third captured image, the first processor transmits information representing the target area to the third projector, and in a case where the set target area is contained in the first captured image, the first processor corrects the first image with reference to the target area.

16. The image projection system according to claim 8, wherein the first and second images are black images, and correction performed by the first and second processors is black level correction.

17. The image projection system according to claim 8, wherein data of the first captured image and data of the second captured image are output as RGB data, and the first and second processors use a G pixel value of the RGB data to calculate the image correction.

18. A first projector that projects a first image, the first projector comprising:

a processor that corrects the first image based on a first captured image produced by a first camera provided to the first projector capturing a range containing part of a second image projected by a second projector that is separate from the first projector and at least part of the first image and with reference to a target area contained in the range over which the first captured image is captured, the target area being an area having highest brightness, among a range containing at least part of the first image and part of the second image, the second projector having a second camera provided thereto for capturing a second captured image used in correcting the second image, wherein the first projector receives the second captured image captured by the second camera provided to the second projector, the first projector compares the first captured image and the second captured image to determine the target area, and the first projector transmits information regarding the target area to the second projector for correcting brightness of the image projected by the second projector.

19. The projector according to claim 18, wherein the first and second images are black images, and correction performed by the processor is black level correction.

20. The projector according to claim 18, wherein data of the first captured image is output as RGB data, and the processor uses a G pixel value of the RGB data to calculate the image correction.

* * * * *